United States Patent [19]

Smith

[11] Patent Number: 4,625,275

[45] Date of Patent: Nov. 25, 1986

[54] APPARATUS FOR DISPENSING MONEY ORDERS

[75] Inventor: Lawrence G. Smith, Orlando, Fla.

[73] Assignee: Republic Money Orders, Inc., Dallas, Tex.

[21] Appl. No.: 596,291

[22] Filed: Apr. 3, 1984

[51] Int. Cl.$^4$ ............... G06F 15/21; G06F 15/30
[52] U.S. Cl. .................... 364/401; 235/379; 235/432; 364/406; 364/900; 364/479; 400/121
[58] Field of Search ............... 364/400, 401, 406, 408, 364/478, 479, 519, 200 MS File, 900 MS File; 235/375, 379–382.5, 432, 433; 400/121, 124

[56] References Cited

U.S. PATENT DOCUMENTS

| | | | |
|---|---|---|---|
| 3,814,227 | 6/1974 | Hurd, III et al. | 400/121 |
| 3,848,798 | 11/1974 | Riley | 235/101 |
| 3,970,992 | 7/1976 | Boothroyd | 364/900 |
| 3,984,660 | 10/1976 | Oka et al. | 235/379 |
| 3,997,763 | 12/1976 | Schasser | 235/432 |
| 4,025,905 | 5/1977 | Gorgens | 364/900 |
| 4,035,792 | 7/1977 | Price et al. | 340/570 X |
| 4,053,735 | 10/1977 | Foudos | 364/401 X |
| 4,082,945 | 4/1978 | van de Goor et al. | 235/379 |
| 4,175,694 | 11/1979 | Donabin | 235/431 X |
| 4,225,779 | 9/1980 | Sano et al. | 364/900 X |
| 4,266,121 | 5/1981 | Hirose | 235/381 |
| 4,270,042 | 5/1981 | Case | 235/379 |
| 4,317,028 | 2/1982 | Simjian | 235/379 X |
| 4,341,951 | 7/1982 | Benton | 364/406 X |
| 4,355,369 | 10/1982 | Garvin | 364/900 |
| 4,385,285 | 5/1983 | Horst et al. | 235/379 X |
| 4,417,137 | 11/1983 | Lundblad | 235/379 |

Primary Examiner—Joseph Ruggiero
Attorney, Agent, or Firm—Michael A. O'Neil; David H. Judson

[57] ABSTRACT

A method and apparatus for dispensing money orders at a plurality of retail establishments is provided, including one or more data collector devices connected to a host device. Preferably, each of the money order dispensers include a digital processor for controlling the overall operation thereof, a keyboard for entering transaction data to request the printing of a money order, a display for displaying the transaction data, and a dot matrix printer for printing the requested money order. Each dispenser further includes an electrically-eraseable programmable read only memory (E$^2$PROM) for storing a security inhibit printing code, this code being automatically changed to prevent actuation of the printer when the security of the dispenser is compromised. The physical dimensions of the money order dispenser are reduced by providing a dot matrix printer for receiving money orders in a transverse fashion, and software routines are provided to control the dot matrix printer to "rotate" the printed characters whereby money orders are dispensed in a readable fashion.

11 Claims, 5 Drawing Figures

APPARATUS FOR DISPENSING MONEY ORDERS

TECHNICAL FIELD

The present invention relates generally to dispensing machines, and more particularly to a method and apparatus for dispensing money orders at a plurality of retail establishments.

BACKGROUND OF THE INVENTION

Money order dispensing machines are well-known in the prior art. Such machines typically include a number of moveable printing levers and a printing control arm. In response to a customer request, the machine operator positions the printing levers at a position corresponding to the requested amount of the money order, inserts a blank order in the machine, and actuates the printing control arm. The above steps must be repeated each time a money order is requested by a customer.

Such mechanical money order dispensing machines have proven inadequate since they do not include any effective means for securing the dispenser. In particular, the machine operator can produce a "counterfeit" order by simply separating a blank money order into its separate parts, a customer portion and a vendor portion, and printing different numerical amounts thereon. Such counterfeiting techniques are facilitated by the simple mechanical nature of the prior art money order dispenser, wherein blank money orders are inserted one at a time for manual printing. Of course, this manual operation also makes the dispenser combersome to use, as well as extremely slow.

Accordingly, there is a need to provide a money order dispenser having increased security, and which can also vend money orders efficiently.

SUMMARY OF THE INVENTION

The present invention provides a method and apparatus for dispensing money orders at a plurality of retail establishments. In a preferred embodiment, one or more sets of money order dispensers are connected to one or more data collector devices, respectively, with the data collector devices in turn connected to a host device for controlling the overall operation of the system. Generally, each of the money order dispensers includes a digital processor to control the operation thereof, a keyboard for entering transaction data to request the printing of a money order, and a display for displaying system messages and the entered transaction data. Memory devices associated with the digital processor are also provided for storing transaction data, operating programs and control data, and a dot matrix printer is used for printing alphanumeric indicia on the dispensed money orders.

In accordance with more specific features of the present invention, each dispenser preferably includes an electrically-eraseable programmable read only memory (E²PROM). This E²PROM stores a security inhibit printing code which must be "recognized" by a printer software routine to enable the dot matrix printer. Each dispenser further stores a control software routine which operates to change or erase the security inhibit printing code stored in the E²PROM when the security of the dispenser is compromised. For example, when a storage compartment cover of the dispenser is opened outside of a proper money order loading sequence, the control software routine changes the security inhibit printing code, thereby inhibiting the dot matrix printer. However, the remainder of the dispenser peripherals operate normally to allow the system operator to reestablish printer operation after the "compromised" condition has been rectified.

Preferably the dot matrix printer receives a money order in a transverse fashion with respect to the normal direction of printing thereon. This facilitates the use of a small printer, thereby reducing the overall dimensions of the dispenser. The printer software routine associated with the dispenser is further used to control the dot matrix printer in such a manner to change the normal orientation of the alphanumeric indicia printed on the money order such that the order is produced with the requested amount in a readable form. The dot matrix printer also includes a photocell sensing device for determining whether a money order and a printing ribbon are properly located in the dot matrix printer prior to the printing of the order. The money orders are delivered to the dot matrix printer in a continuous fan-folded stack. These features of the present invention insure that "counterfeit" money orders cannot be printed by the vendor.

In accordance with other features of the present invention, each data collector has a "manager" function which allows the system operator (e.g., a financial institution) to define control data for managing the operation of the dispensers connected thereto. In particular, the operator may predetermine authorized operational limits, such as a maximum limit on the amount of the money order, maximum amounts for higher limit items available with proper authorization codes, and various fee rates to be charged to the customers. This control data and changes thereto are down-loaded into the E²PROM associated with each processor.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
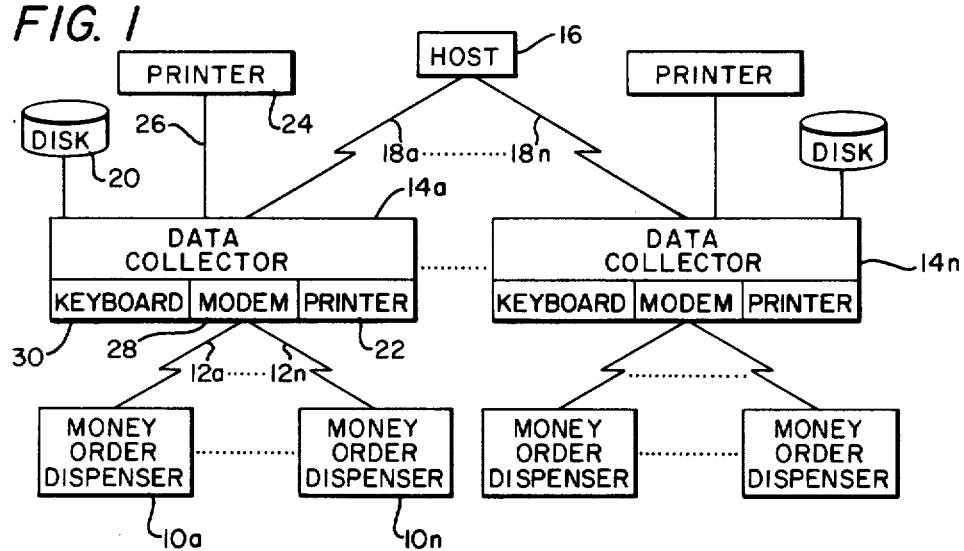
FIG. 1 is a block diagram of a desired system configuration incorporating a plurality of money order dispensers connected to one or more data collector devices, which are in turn connected to a host device.

With reference now to the FIGURES wherein like reference characters designate like or similar elements, FIG. 1 is a block diagram of a representative system according to the present invention for dispensing money orders at a plurality of retail establishments. In FIG. 1, a money order dispenser 10a is shown connected directly through a communications link 12a to a data collector 14a. The dispenser 10a is located at a retail establishment where customers request the issuance of a money order from the retail establishment vendor. The data collector 14a provides various management functions for money order dispensers 10a-10n on a time-shared basis. In the preferred embodiment, a plurality of data collectors 14a-14n are connected to a host device 16 through communications links 18a-18n. Each communications link 18 is either a modem link or an RS232 serial full-duplex interface for direct connection to the host device 16. Alternately, the data collectors 14 may be connected to an external modem (not shown) and then to the host device 16.

As shown in FIG. 1, the data collector 14a includes a floppy diskette 20 for storing a cumulative record of the money order transactions at its respective money order dispensers 10a-10n. Data collector 14a also includes an internal printer 22 for printing this transaction information, although alternately, an external printer 24 is used for this purpose through an RS232 serial link 26. An internal modem 28 is also provided for direct communications to the money order dispensers 10a-10n over the communications links 12a-12n at variable baud rate settings. As will be described in more detail below, each data collector 14 has the ability to read and program various memory devices in each money order dispenser connected thereto.

Referring again to FIG. 1, the data collector 14a further includes a full alphanumeric keyboard 30 which, as will be described below, allows the system operator (e.g., a financial institution) to define control data for managing the operation of the money order dispensers connected thereto. In particular, through the keyboard 30, or alternately a "manager" function switch associated with the data collector 14a, the operator sets limits on the following variables listed in TABLE I:

TABLE I

| VARIABLE NAME | DEFINITION |
|---|---|
| [-MCH MO# XXXXX-] | Total number of money orders to be printed before dispenser must be reauthorized |
| [-MCH MO# XXXXXXX-] | Maximum money order dollar amount to be issued before dispenser must be reauthorized |
| [-CST MO$ XXXXX.XX-] | Maximum dollar value per money order per customer |
| [-MCH CK# XXXXX-] | Maximum number of vendor payments which may be printed before dispenser must be reauthorized |
| [-MCH CK# XXXXX.XX-] | Maximum vendor payment dollar amount which can be issued before dispenser must be reauthorized |
| [-CST MO# XXXX-] | Maximum number of money orders which can be printed per customer |
| [-VND CK# XXXX-] | Maximum number of vendor payments which can be printed per vendor |
| [-VND CK# XXXXX.XX-] | Maximum dollar amount per vendor payment |
| [-WARN-#BLANKS XX-] | Number of blank money orders left in dispenser when warning issued |
| [-WARN-#TRANS XX-] | Amount of transaction storage left in dispenser memory when warning is issued |
| [-LOCK # ERRORS XX-] | Number of errors allowed before dispenser locks. |

As used throughout the remainder of the specification, the above limits and codes are referred to as "control" data. This control data is transmitted to the various money order devices 10a-10n located at the plurality of retail establishments.

Preferably, each of the order data collectors 14 shown in FIG. 1 include the same type of peripheral devices associated with the data collector 14a. The data collectors 14a-14n also have the capability of automatically polling their associated money order dispensers on command, as well as the ability to recognize invalid data transmissions. Moreover, each data collector includes various software routines for controlling such automatic polling, and for providing test procedures to aid in trouble-shooting and repairing the dispensers.

It should also be appreciated that although the configuration of FIG. 1 is desirable, it is not meant to limit the scope of the present invention. In particular, each money order dispenser of the invention is capable of fully independent stand-alone operation, as well as a direct on-line connection to a point-of-sale system.

Figure 2:
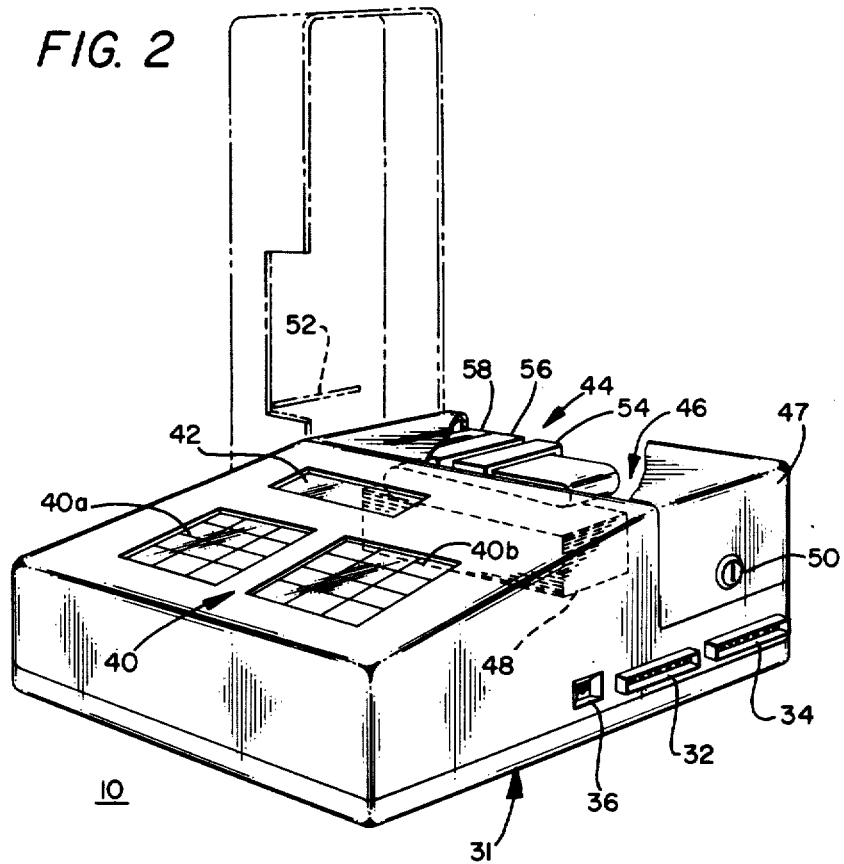
FIG. 2 is a perspective view of one of the money order dispensers of FIG. 1 having its open storage compartment cover shown in phantom.

Referring now to FIG. 2, a perspective view is shown of one of the money order dispensers 10 of FIG. 1. Preferably, the money order dispenser 10 includes a removable bottom panel 31 which is fastened to a countertop at the retail establishment by appropriate securing means. The dispenser 10 is designed to be operable from 115 volts a.c. power, or d.c. power from an appropriate point-of-sale system. The power options are selectable by an internal selection switch (not shown). The dispenser 10 includes two RS232 connector input jacks 32 and 34 for connection to an external journal printer and external modem, respectively. The journal printer (not shown) is a conventional dot matrix printer and is provided for printing a journal tape of all transactions of the money order dispenser. The dispenser 10 also includes a modular phone jack 36, which is connected to an internal modem for data transmission to one of the data collectors 14 as shown in FIG. 1. When the internal modem is not used, the modem interface is brought to the RS232 connector jack 34 for connection to an external modem. Preferably, the external connection is used whenever an acoustical modem is required.

Referring back to FIG. 2, the money order dispenser 10 includes several input/output devices: a keyboard 40 having first and second sections 40a and 40b, a liquid crystal display (LCD) 42 and a dot matrix printer assembly represented generally by the reference numeral 44. As will be described in more detail below, each section of the keyboard 40 includes twelve (12) control keys for entering transaction data to request the printing of a money order, as well as for controlling other functions of the dispenser. The LCD display 42 is preferably a twelve (12) digit display for displaying the transaction data entered via the keyboard 40, and for displaying system messages received from the data collector and host devices associated with the money order dispenser. The dot matrix printer assembly 44 is provided to print the money orders held in a storage compartment 46. As shown in phantom in FIG. 2, the money orders are provided in a continuous fan-folded stack 48 in the storage compartment 46 to insure that counterfeit money orders cannot be printed by the vendor. A keylock 50 is provided to secure a storage compartment cover 47 in a locked position in the dispenser housing. This lock may be electronic if desired. The stack 48 of money orders is loaded into the dispenser by opening the storage compartment cover 47 to an open position as represented in phantom.

As also seen in FIG. 2, the storage compartment cover 47 includes an output throat 52 through which the printed money orders are dispensed. To effect printing of a money order, the dot matrix printer assembly 44 is provided with a sprocket and/or pressure feed clamp 54 for moving the money orders through the dispenser 10, a dot matrix printer 56 and a printing ribbon 58. In response to a customer request for a money order, the vendor enters the requested amount via the keyboard 40 as will be described below. If the money order is within the authorized limits of the dispenser, the dot matrix printer 56 is actuated to print the requested amount alphanumerically on the face of the money order. Upon completion of the printing, the pressure feed clamp 54 automatically advances the printed money order through the output throat 52 for manual removal by the operator. The transaction data, including money order amount, date and time, is then stored on a journal tape by the external journal printer, and also in internal memory.

As will be described below, the dot matrix printer 56 preferably includes a printer carriage for receiving the money order in a transverse fashion with respect to the normal printing of alphanumeric information thereon. This transverse feeding of the money orders allows the use of a relatively small dot matrix printer, thereby reducing the overall physical dimensions of the dispenser. The present invention further provides a control means for controlling the dot matrix printer to "rotate" the alphanumeric indicia printed on the money order such that the money order is produced in a readable form. The control means is required since normal printing of the indicia would render the money order unreadable due to the transverse feed. Accordingly, a printer software routine to be described is provided for controlling the printer to produce readable alphanumeric indicia on the printed money orders.

Figures 3, 4:
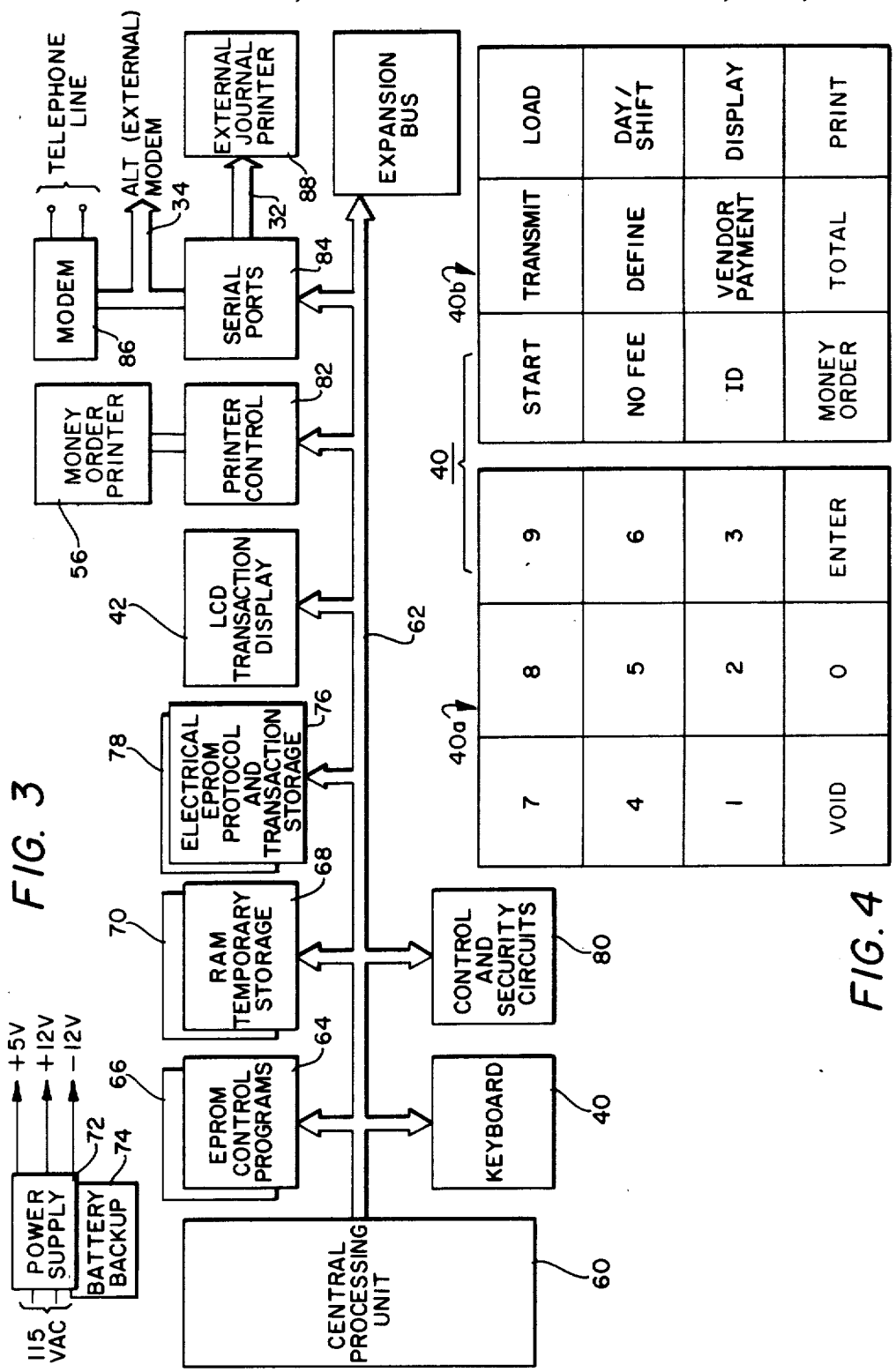
FIG. 3 is a block diagram of the electronic hardware incorporated in the money order dispenser of FIG. 2.
FIG. 4 is a representation of the preferred embodiment of the keyboard used in the money order dispenser of FIG. 2.

Referring now to FIG. 3, a block diagram is shown of the electronic hardware incorporated in the money order dispenser of FIG. 2. In particular, this hardware includes a central processing unit (CPU) 60 for controlling the overall operation of the money order dispenser 10a. The CPU 60 includes data, address and control buses, represented generally by the bus 62. As seen in FIG. 3, the keyboard 40, LCD display 42 and money order printer 56 are connected to the CPU 60 and are controlled thereby by various operating and applications programs resident in eraseable programmable read only memories (EPROM's) 64 and 66. EPROM's 64 and 66 are connected to the CPU 60 by the bus 62. As also seen in FIG. 3, the money order dispenser 10 includes random access memories (RAM's) 68 and 70 connected to the CPU 60 by the bus 62 for providing temporary storage of data processed by the CPU. The money order dispenser further includes a power supply circuit 72 driven off a standard 115 volts a.c. wall outlet, and an internal rechargeable battery backup 74. The battery backup 74 is provided to supply power for a sufficient time to allow complete memory protection should power be suddenly interrupted to the dispenser 10.

The money order dispenser 10 further includes a pair of electrically-eraseable programmable read only memories (E²PROM's), or equivalent semi-permanent memory devices such as a battery supported 76 and 78 connected to the CPU 60 by the bus 62. The E²PROM 76 is provided for storing various communication protocols utilized by the money order dispenser. In particular, the E²PROM 76 supports the NCR foreign attachment protocol, MSI special protocol, SDLC protocol and IBM 3680 store system interface. Additional protocols may be down-loaded into the E²PROM 76 by the data collector as required. Data and control codes for the above protocols are well known in the prior art and a description thereof is unnecessary for a complete understanding of the present invention.

According to a feature of the present invention, the E²PROM 78 is provided to store the transaction data for between 500-2000 vendor/customer transactions. Moreover, the E²PROM 78 also stores a security inhibit printing code for the money order dispenser 10 for security purposes. The printer software routine for controlling the dot matrix printer 56 must "recognize" the security inhibit printing code resident in E²PROM 78 in order to operate the dot matrix printer 56. If the security of the money order dispenser is compromised in any way, a control software routine stored in EPROM 64 operates to change or erase the security inhibit printing code stored in the E²PROM 78. Once this code has been changed or erased, the software for controlling the printer 56 cannot be processed by the CPU 60, thereby preventing further printing of money orders from the dispenser. However, although the printer operation is inhibited, the remainder of the dispenser peripherals operate normally to allow the link to be restored by the financial institution. Preferably, the security inhibit printing code is down-loaded from the respective data collector device or the host device, and may be changed at regular intervals for increased security.

A "compromised" condition exists, for example, when the storage compartment cover 47 is opened outside of a normal money order loading sequence to be described, or when the bottom panel 31 is removed without a service request. The security code will also be changed or erased to inhibit the printer when power to the dispenser is interrupted, or if no recent communications have taken place within authorized time limits.

A control and security circuit 80 is also provided and includes an internal clock for controlling the timing of the various circuits shown in FIG. 3, and also for defining the date and if a previously determined amount or number of money orders, or other system operator-imposed constraints, have been exceeded, time information for the transaction data. As discussed above, the LCD display 42 is provided for displaying this transaction data as well as system messages. The display software stored in EPROM 66 also disables the display if the dispenser is not in use for a period of time, and controls the display to indicate when the E²PROM 78 is approximately filled with transaction data. The money order dispenser 10 will discontinue further issuance of money orders and notify the operator if the E²PROM 46 is full. According to the present invention, the transaction data is then transmitted to the respective data collector device of FIG. 1 before the money order dispenser 10 may again issue money orders. The use of the non-volatile reusable E²PROM 78 or equivalent device in conjunction with the battery backup 74 insures that the transaction data is not lost upon power failure or surges.

Referring simultaneously to FIGS. 2 and 3, the dot matrix printer 56 is controlled by a printer control circuit 82 connected to the CPU 60 by the bus 62 and the printer software routine. The money order dispenser 10 further includes serial ports 84, connected to the CPU 60 by the bus 62, for driving a internal modem 86, and the external journal printer 88 via an RS232 duplex link. As noted above, when the internal modem 86 is not used, the modem interface is brought to the RS232 connector jack 34 for an external modem. Preferably, the external modem connection is used whenever an acoustical modem is required.

Referring now to FIG. 4, a desired format of the keyboard 40 of the money order dispenser is shown. This keyboard includes a first section 40a including the numerical keys "0"-"9" for entering control and transaction data, and a "VOID" and "ENTER" control key. The second section 40b of the keyboard 40 includes various control keys, the function of which will be described in more detail below.

Operation of the money order dispenser 10 of the present invention occurs through a plurality of operation modes. The first of these modes is a "Definition Mode", during which various codes are entered, inspected or changed by the operator. The LCD display 42 defines which entry to enter, inspect or change. In operation of this mode, if the entry is to be changed, a new value is entered via the first section 40a of the keyboard 40 followed by depression of the "ENTER" key. If the displayed entry is to remain unchanged, the "ENTER" key is the only key depressed. The control keys of the second section 40b generally define what messages are presented to the operator.

Since the money order dispenser is preferably left "on" at all times, the Definition Mode is entered when the operator pushes the "START" and "DEFINE" keys of the second section 40b. The following message is then displayed on the display 42:

[-SECURITY #_____-]

The security number is a five digit number and is not displayed. This number must be correctly entered by the vendor in order for the sequence to continue. After the security number has been entered and verified, a manual entry of a store identification number is required. Accordingly, the following store number message is displayed on the LCD display 42:

-STXXXXXXXXXXXXXX-]

The store number may be 1-14 characters long and once entered by the vendor is transmitted to the respective data collector as discussed above with respect to FIG. 1.

The Definition Mode sequence continues with depression of the "DAY/SHIFT" key which produces the following sequential displays for entering or verification of date and time information, this information being recorded as part of the transaction data:

[-DATE XX/XX/XX-]

[-TIME XX:XX:XX-]

The Definition Mode sequence further continues with the following displays for entering of identification entries, money order fees, a phone number dialed automatically under certain conditions, and an "ID USE" code for money order and vendor payment transactions:

[-ID XXX-]

[-FEE XXX.XX, YY.YY-]

[-PHX-XXX-XXX-XXXX-]

-continued

[-ID USE    X-]

Specifically, the system includes twenty money order fees where XXX.XX is the dollar breakpoint, and YY.YY is the fee charged for any money order greater than the previous money order and less than or equal to the present XXX.XX breakpoint. The "ID USE" code takes on the following possible values:
  0—No ID Number needs to be entered;
  1—All ID Numbers are entered at the start of the day only;
  2—A valid ID Number must be entered for each transaction.

Entering of the above code information at the money order dispenser, as well as the information in TABLE I at the data collector, constitutes the Definition Mode. Once the last enter key has been pressed at the dispenser, the display screen 24 will blank and the Definition Mode will be exited.

Under a "Start Mode", the operator of the money order dispenser at a retail establishment enters certain information at the start of each day. In particular, a start-up "ID" or "access" code is required to operate the dispenser. In the Start Mode, actuation of the "START" key of the second section 40b causes the following message to be displayed:

[-ID -]

The operator must then enter a valid ID number to start the system. If the "ID USE" code discussed above is "1", the rest of the valid ID numbers must then be entered. Subsequently, the following message is displayed:

[-BEG #XXXXXXXXX-]

The above display prompts the operator to enter an internal serial number of the first money order in the stack. The serial number is automatically incremented for each money order dispensed. Once the last enter key has been depressed, the display screen will blank and the Start Mode will be exited.

The third mode of operation is the "Issue Money Order" Mode. This Mode is entered when a customer requests the issuance of a money order. To accomplish this task, the operator pushes the "START" key of the second section 40b. If the "ID USE" Code is "2", an "ID" number is required, and this number is then entered via the first section 40a of the keyboard, followed by depression of the "ID" key of the second section 40b. If no fee is to be charged, the "NO FEE" key of the second section 92 is also depressed. Subsequently, a dollar amount for the money order is entered via the numeric keys of the first section 40a followed by depression of the "MONEY ORDER" key of section 40b. The "TOTAL" key of section 40b is then depressed if more than one money order is required to be printed. The fee for each money order is automatically added to the total. Finally, the "PRINT" key of section 40b is then depressed and the requested money order is printed by the dot matrix printer 56 as discussed above with respect to FIG. 2. Note that if the "VOID" key of section 40a is depressed before the "TOTAL" key, however, the last money order entry will be voided. Moreover, if the "VOID" key is depressed before the "PRINT" key is depressed, all the money orders for the current customer are voided.

Under another operational mode, an "Issue Vendor Payments" Mode, the vendor of the retail establishment may receive payments according to the limits established by the operator of the data collector device. This mode requires depression of the "START" key and entering of an "ID" if the "ID USE" code is set as "2". Subsequently, the "VENDOR PAYMENT" key of section 40b is depressed followed by the "TOTAL" and "PRINT" keys as discussed above with respect to the issuance of a money order.

Under a "Load Mode", money order forms are loaded into the money order dispenser 10. This is accomplished by opening the money order storage compartment cover 47, depressing the "START" key and then a "LOAD" key of section 40b. Depression of these keys will produce the following sequential display messages:

[-SECURITY #        -]

[-BEG # XXXXXXXX-]

[-END # XXXXXXXX-]

The security number is the same number discussed above in the Definition Mode. The last two codes above are the beginning and ending serial numbers of the blank money order stock which must be entered when loading a new series of money orders. Once the last enter key has been depressed and the storage compartment cover 47 has been closed, the display 42 will blank and the Load Mode will be exited.

The money order dispenser also includes a "Transmission Mode" which is entered upon depression of the "START" and "TRANSMIT" keys of section 40b. Upon depression of these keys, the following sequential display messages occur:

[-SECURITY #-]

[-DIAL TELEPHONE #-]

After entering of the security number and dialing the telephone number for connection to the appropriate data collector, the operator places the phone receiver in the modem. The "START" key is then depressed to cause the dispenser to transmit the stored transaction data in E²PROM 78 to the data collector. After transmission the following message is displayed to prompt the operator to disconnect the dispenser from the modem:

[-DISCONNECT RMOD-]

This constitutes the Transmission Mode. Once the last data is transmitted and a verification signal is received by the money order dispenser, the dispenser automatically terminates the connection, displays the above disconnect message and exits the Transmission Mode.

As discussed above, an important feature of the present invention is the use of the dot matrix printer 56 which is designed to receive a money order in a transverse direction with respect to the printing of normal indicia thereon. The movement of money orders through the dot matrix printer in a transverse fashion facilities the use of a small dot matrix printer, thereby reducing the overall dimensions of the money order dispenser of the present invention. However, since the money order is passed through the dot matrix printer in a transverse fashion, normal printing of indicia thereon would render the money order unreadable. To overcome this problem, the present invention includes software routines stored in the EPROM's 64 and 66 to "rotate" the alphanumeric characters during printing on the money order. Therefore, since the money orders pass through the dot matrix printer in a transverse fashion, and the characters are rotated under software control, the money order exits from the dispenser in a readable fashion.

Figure 5:
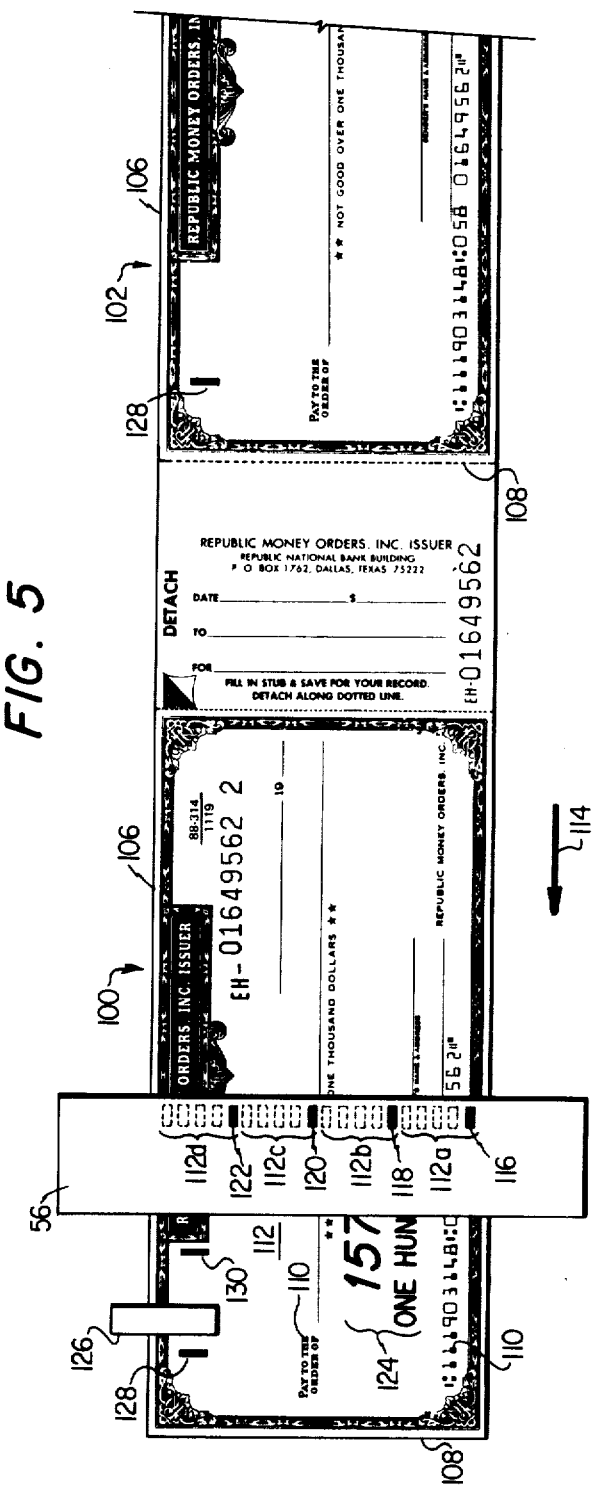
FIG. 5 is a top view of the dot matrix printer incorporated in the dispenser of FIG. 2 detailing the movement of a money order therethrough.

Referring now to FIG. 5, a top view is shown of the movement of a money order through the dot matrix printer 56 of the present invention. Specifically, the continuous fan-folded stack 48 of money order forms includes a money order form 100 currently being printed and a next money order form 102. As seen in FIG. 5, each of the money order forms includes relatively long longitudinal sides 106 and relatively short transverse sides 108. Each money order form is interconnected along the transverse sides 108 thereof. As also seen in FIG. 5, each of the money order forms includes indicia 110 preprinted thereon in a longitudinal direction.

In operation, the pressure feed clamp 54 advances the money order forms 100 and 102 serially through a printing zone 112 by movement of the fan-folded stack in the longitudinal direction as represented by the arrow 114. The dot matrix printer 56 includes printing elements, for example 116, 118, 120 and 122, each of which reciprocate transversely to print alphanumeric indicia in four regions of the printing zone 112. Specifically, print element 116 moves transversely through the region 112a of the printing zone 112, print element 118 moves transversely through the printing zone 112b, and so forth.

Therefore, as seen in FIG. 5, the dot matrix printer 56 extends transversely across the printing zone 112 for printing variable alphanumeric indicia on the money order forms. It should be appreciated, however, that since the dot matrix printer normally prints indicia in a transverse direction, normal operation of the printer would render the money order forms unreadable. Accordingly, the printer software routine controls the various print elements 116, 118, 120 and 122 to form the variable alphanumeric indicia 124 on the money order forms in the longitudinal direction. Thus the money order forms are output from the money order dispenser in a readable fashion.

According to another important feature of the present invention, the dot matrix printer assembly 44 includes a photocell 126 which is used to sense the presence of first and second code marks 128 and 130, printed on the money order forms. Specifically, the first code mark 128 is preprinted on each money order form for the purpose of ensuring that the money order forms are properly aligned prior to printing. To this end, the photocell 126 generates a first control signal to the digital processor 60 upon reading the first code mark 128, thereby indicating proper alignment of the money order form. Moreover, prior to the printing of the variable alphanumeric indicia 124 on the money order 100, the printing ribbon 58 is actuated to print the second code mark 130. In operation, the photocell 126 must sense the presence of the second code mark 130 prior to printing of the alphanumeric indicia 124. Accordingly, the printing ribbon 58 must be properly located to effect printing of the second code mark 130 before the dot matrix printer 56 is driven to print a money order. This feature of the present invention ensures that "counterfeit" money orders cannot be printed by manipulation of the printing ribbon, or other disablement of the printing device.

The program listings for (1) changing the security inhibit printing code, (2) controlling the keyboard operation as described above with respect to FIG. 4, and (3) accomplishing the printing of "rotated" alphanumeric indicia on a money order are set forth below:

```
EEPROM DATA AREA

PAGE
;EEPROM DATA LOCATED AT E000H-E3FFH
EPRM       SEGMENT AT 0E000H
;DOWN LOADED STORE INFORMATION
SCRTY      DM          ?              :SECUTITY NUMBER
STACC      DM          ?              :STORE #   MAJOR ACCOUNT
STSTE      DB          ?              :STORE #   STATE
STSUB      DB          ?              :STORE #   SUB ACCOUNT
STDIV      DM          ?              :STORE #   DIVISION
STSTR      DM          ?              :STORE #   STORE
MONTH      DB          ?              :DATE   MONTH
DAY        DB          ?              :DATE   DAY
YEAR       DB          ?              :DATE   YEAR
PHONE      DB          11 DUP(?)      :TELEPHONE NUMBER

USE        DB          ?              :ID USE CODE 0 NO ID NEEDS TO
                                      BE ENTERED
                                      :1=ONE ID PER SHIFT/DAY
                                      :2=ID FOR EVERY TRANSACTION
ID         DB          NID DUP(?)     :IDENTIFICATION NUMBERS

:RMOD STATUS INDICATORS - 0/1
RMODS      DB          ?              :RMOD STATUS - CLOSED/OPEN
MODMS      DB          ?              :MODEM STATUS - DISCNCT/DNCT
CMPPS      DB          ?              :MC PRINTER STATUS -
                                      OK/DISABLED
JRRRS      DB          ?              :JR PRINTER STATUS - OK
                                      DISABLED

RO Assembles 03-06-84                 PAGE 1-8

EEPROM DATA AREA

KEYBS      DB          ?              :KEYBOARD STATUS - OK/LOCKED

;DATA DETERMINED AT RUN TIME-STORED HERE TO PRESERVE WHEN POWER
OFF
LOCKC      DB          ?              :ERROR COUNT BEFORE LOCKUP
TRPTR      DB          ?              :TRANSACTION POINTER
TXPTR      DB          ?              :TRASMISSION POINTER
FIDT       DB          NID DUP (?)    :FEE TOTAL PER ID

MCNT       DW          ?              :MO NUMBER TOTAL
MAMT       DD          ?              :MO AMOUNT TOTAL
VCNT       DW          ?              :VP NUMBER TOTAL
VANT       DD          ?              :VP AMOUNT TOTAL
FAMT       DD          ?              :FE AMOUNT TOTAL
VOID       DW          ?              :NUMBER OF VOIDS
TCNT       DW          ?              :TOTAL TRANSACTIONS
TAMT       DD          ?              :TOTAL AMOUNT

:TRNSACTION BUFFER-FILLS UP REST OF EEPROM-ROTATING BUFFER
TRBFRS ,   DB          ?              :START OF TRANSACTION BUFFER
TRBFRE     DB          ?              :END OF TRANSACTION BUFFER
EPRM       ENDS

:EEPROM DATA LOCATED E4000H-E5FFFH
:DOWN LOADED PROTOCOL INFORMATION
EPRM       SEGMENT AT 0E400H
:$$$NO DATA DEFINED$$$
EPRM       ENDS
SUBTTL     START OF PROGRAM - POWER OF SELF TEST AND
           INITIALIZATION AT FE000H
```

START OF PROGRAM

PAGE

```
CODE    SEGMENT OF AFE00H
START:  CLI                     ;DISABLE INTERRUPTS
                                ;TEST FLAGS, REGISTERS,
                                  CONDITIONAL JUMPS
        MOV     AH,0D5H         ;SET FLAGS-SF,ZF,AF,PF,CF
        SAHF
        JNS     STERR
        JNZ     STERR
        JNP     STERR
        JNC     STERR
        LAHF
        MOV     CL,5            ;SET CARRY
        SHR     AH,CL
        JNC     STERR
        MOV     AL,40H          ;SET OVERFLOW
        SHL     AL,1
        JNO     STERR
        XOR     AX,AX           ;CLEAR FLAGS
        SAHF
        JS      STERR
        JZ      STERR
        JP      STERR
        JC      STERR
        LAHF
        MOV     CL,5            ;RESET CARRY
        SHR     AH,CL
        JC      STERR
        SHL     AH,1            ;RESET OVERFLOW
        JO      STERR
                                ;TEST REGISTERS WITH ALL ONE'S
                                  AND ZERO'S
        MOV     AX,OFFFFH
        STC                     ;SET CARRY - LOOP CONTROL
STRT1;  MOV     DX,AX           ;LOOP TO WRITE PATTERN TO ALL
                                  REGISTERS
        MOV     BX,DS
        MOV     ES,BX
        MOV     CX,ES
        MOV     SS,CX
        MOV     DX,SS
        MOV     SP,DX
        MOV     BP,SP
        MOV     SI,BP
        MOV     DI,SI
        JNC     STRT2
        XOR     AX,DI           ;END OF FIRST TIME THROUGH
        JNZ     STERR           ;PATTERN NOT ALL ONE'S
        CLC                     ;CLEAR CARRY
        JNC     STRT1           ;REPEAT WTIH ALL ZERO'S
STERR;  HLT                     ;POWER ON SELT TEST ERROR
STRT2;  OR      AX,DI           ;END OF SECOND TIME THROUGH
        JNZ     STERR           ;PATTERN NOT ALL ZERO'S
                                ;TEST RAM WITH FF,AA,55,01,00
                                  PATTERNS
        SUB     AX,AX           ;INITIALIZE ES & DS
        MOV     ES,AX
        MOV     DS,AX
        SUB     DI,DI
        MOV     BX,LMCSD        ;COMPUTE UPPER LIMIT OF RAM
        MOV     CL,4
        SHL     BX,CL           ;CANNOT BE > OFFFFH
        OR      BX,00ZEH        ;RAM COUNT
        MOV     AX,OFFFFH
        MOVE    DX,55AAH
```

START OF PROGRAM

```
        CLD                     :INCREMENT FLAG
        MOV     CX,BX           :COUNT
        REP     STOSB           :FILL RAM WITH FIRST PATTERN
```

```
STRT3:      DEC     DI              ;POINT TO LAST BYTE
            STD                     ;DECREMENT FLAG
STRT4:      MOV     SI,DI
            MOV     CX,BX
STRT5:      LODSB                   ;READ PATTERN STORED
            XOR     AL,AH           ;TEST IF OK
            JNE     STERR           ;TEST NOT OK
            CMP     AH,0
            JE      STRT6           ;ZERO PATTERN
            MOV     AL,DL
            STOSB                   ;WRITE NEXT PATTERN
STRT6:      LOOP    STRT5           ;CONTINUE UNTIL ALL OF RAM TEST
            CMP     AH,0
            JE      STRT7           ;RAM TEST COMPLETE
            MOV     AH,AL           ;ROTATE PATTERN
            XCHG    DH,DL
            CLD                     ;INCREMENT FLAG
            INC     DI              ;POINT TO START BYTE
            JZ      STRT4           ;READ/WRITE FORWARD
            DEC     DI              ;READ/WRITE BACKWARD
            MOV     DX,1            ;00 AND 01 PATTERN
            JMP     STRT3
                                    ;INITIALIZE SEGMENT REGISTER & STACK
STRT7       MOV     AX,DATA
            MOV     DS,AX
            MOVE    AX,EPRM
            MOV     ES,AX
            MOVE    AX,STACK
            MOV     SS,AX
            MOV     SP,OFFSET STACKT
                                    ;INITIALIZE THE CHIP SELECT
                                    ;CONTROLLER
            MOV     DX,LMCSR        ;LOWER MEMORY CHIP SELECT
            MOVE    AX,LMCSD        ;16K at 0 - 3FFFH
            OUT     DX,AX
            MOV     DX,PACSR        ;PERIPHERAL CHIP SELECT
            MOV     AX,PACSD
            OUT     DX,AX
            MOV     DX,MMCSR        ;MID-RANGE MEMORY CHIP SELECT
            MOV     AX,MMCSD        ;16K AT E0000H
            OUT     DX,AX
            MOV     DX,MPCSR        ;MID-RANGE MEMORY SIZE
            MOV     AX,MPCSD
            OUT     DX,AX
                                    ;INITIALIZE 8155 - A
            MOV     DX,A8155CS      ;CONTROLS CLOCK, KEYBOARD, DISPLAY
            MOV     AL,A8155CD      ;PORT A,B,C OUTPITS, NO TIMER
            OUT     DX,AL
            INC.    DX              ;PORT A ADDRESS
            MOV     AL,A8155DA      ;ALL OUTPUTS HIGH
            OUT     DX,AL
            INC     DX              ;PORT B ADDRESS
            OUT     DX,AL
            INC     DX              ;PORT C ADDRESS
            OUT     DX,AL
            INC     DX              ;TIMER LOW COUNT ADDRESS
            MOV     AL,A8155TD      ;NO TIME
            OUT     DX,AL
            INC     DX              ;TIMER HIGH COUNT ADDRESS

START OF PROGRAM

OUT     DX,AL

;INITIALIZE 8155 - B
            MOV     DX,B8155CS      ;MONITORS DIP SWITCHES
            MOV     AL,B8155CD      ;PORT A INPUTS, B&C OUTOUTS, NO TIMER
            OUT     DX,AL
            INC     DX              ;PORT A ADDRESS
            MOV     AL,B8155DA      ;ALL INPUTS HIGH
            OUT     DX,AL
            INC     DX              ;PORT B ADDRESS
            OUT     DX,AL           ;ALL OUTPUTS HIGH
```

```
            INC       DX              ;PORT C ADDRESS
            OUT       DX,AL
            INC       DX              ;TIMER LOW COUNT ADDRESS
            MOV       AL,B8155TD      ;NO TIME
            OUT       DX,AL
            INC       DX              ;TIMER HIGH COUNT ADDRESS
            OUT       DX,AL
:$$$NO PROGRAM YET$$$                 ;INITIALIZE THE DMA CONTROLLER
:$$$NO PROGRAM YET$$$                 ;INITIALIZE THE TIME CONTROLLER
:$$$NO PROGRAM YET$$$                 ;INITIALIZE THE INTERRUPT CONTROLLER
            CALL      CLKINT          ;INITIALIZE CLOCK
            CALL      DSPINT          ;INITIALIZE DISPLAY
            CALL      JPRTINT         ;INITIALIZE JOURNAL PRINTER
            CALL      CPRTINT         ;INITIALIZE CHECK PRINTER
                                      ;SET UP INTERRUPT VECTOR TABLE
            MOV       ES:NMIPTR,OFFSET NMI
            MOV       ES:NMIPTR+2, CODE
            MOV       ES:TMROPTR,OFFSET TMRO
            MOV       ES:TMROPTR+2, CODE
            MOV       ES:DMAOPTR, OFFSET DMA0
            MOV       ES:DMAOPTR+2,CODE
            MOV       ES:DMA1PTR,OFFSET DMA1
            MOV       ES:DMA1PTR+2,CODE
            MOV       ES:INTOPTR,OFFSET INTO
            MOV       ES:INTOPTR+2,CODE
            MOV       ES:CLCKPTR,OFFSET CLCK
            MOV       ES:CLCKPTR+2,CODE
            MOVE      ESLINT2PTR,FFSET INT2
            MOV       ES:INT2PTR+2,CODE
            MOV       ES:INT3PTR,OFFSET INTO
            MOV       ES:INT3PTR+2,CODE
            MOV       ES:TMR1PTR,OFFSET TMR1
            MOV       ES:TMR1PTR+2,CODE
            MOV       ES:TMR2PTR,OFFSET TMR2
            MOV       ES:TMR2PTR+2,CODE

CALL      DSPCLR          ;CLEAR DISPLAY
            CLD                       ;FILL KEYBOARD BUFFER WITH SPACES
            MOV       DI,OFFSET KBFR
            MOVE      CX,SKBFR
            MOV       AL,20H
    REP     STOSB
            STI                       ;ENABLE INTERRUPTS
STRT9:      CALL      RMDCK           ;CHECK RMOD
            CALL      KEYB            ;SCAN KEYBOARD
            CALL      PWRCK           ;CHECK FOR POWER DOWN
            JMP       STRT8           ;LOOP FOREVER
CODE        ENDS

;POWER ON RESET VECTOR - LOCATED AT 0FFFFF0H
RESET   SEGMENT AT 0FFFFH
```

RO Asembler 03-06-84   Page 1-12

START OF PROGRAM

```
        MOV       DX,UMCSR        ;UPPER MEMORY CHIP SELECT
        MOV       AX,UMCSD        :BK AT FE000H
        OUT       DX,AX
        JMP       FAR PTR START
        DB        'RM00'
RESET ENDS
        END
```

CRO Asembler 03-05-84   Page 1-3

INT VECTOR 3 - NON MASKABLE INTERRUPT - RMOD INTERLOCK

Page

```
    ;NMI       PROCEDURE-REENTRANT, NONMASKABLE INTERRUPT
    ;             ENTRY-INTERRUPT 2
    ;             EXIT-RMODS=1 - OPEN
```

```
               PUBLIC NMI
NMI            PROC          NEAR
               PUSH          BP
               MOV           BP, SP     ;ESTABLISH BASE POINTER
               PUSH          BX
               PUSH          AX
               PUSHF
               MOV           BX,OFFSET RMODS   ;WRITE RMOD OPEN
                                                    INDICATOR
               MOV           AL,01H
               CALL          WEEPRM     ;WRITE TO EEPROM ONE
                                                    BYTE
               POPF
               POP           AX
               POP           BX
               POP           BP
               IRET
NMI            ENDP
SUBTTL                       INTO - INTERRUPT 0

CRO Assembler 03-05-84       Page 1-1
STERS

TITLE     RMDCK - CHECK RMOD STATUS REGIS
         STERS
                   PAGE          66,132
         CGROUP    GROUP         CODE, CONST, RESET
         CGROUP    GROUP         INTV, STACK,D ATA
         EGROUP    GROUP         PRM

EPRM      SEGMENT       PUBLIC EPRM
                   EXTRN         RMODS:BYTE, CKPRS:BYTE
                   EXTRN         JRPRS:BYTE, KEYBS:BYTE, LCCKC:BYTE
                   EXTRN         LOCK:BYTE
         EPRM      ENDS

CODE      SEGMENT PUBLIC CODE
         ASSUME    CS:CGROUP, DS:DGROUP, SS:DGROUP,ES:EGROUP
                   EXTRN         WEEPRM:NEAR

;RMDCK PROCEDURE - CHECK ALL VITAL RMOD STATUS REGISTERS
;         IF RMOD WAS OPENED                       - RMODS=1 OR
;         IF ERROR COUNT EQUALS MAXIMUM            - LOCKC=LOCK
;         THEN MONEY ORDER PRINTER IS DISABLED     - CKPRS=1AND
;            JOURNAL PRINTER IS DISABLED           - LRPRS=1AND
;            KEYBOARD IS LOCKED                    - KEYBS=1
         PUBLIC RMDCK
RMDCK    PROC          NEAR
         XOR           AL,AL
         TEST          RMODS,01H       ;TEST RMOD FOR OPEN
         JNZ           RMDCK1          ;OPEN
         MOV           AH,LOCKC        ;ERROR COUNT
         CMP           AH,LOCK         ;MAXIMUM ERROR COUNT
         JB            RMDCK2          ;MAXIMUM ERROR COUNT
                                            NOT REACHED
RMDCK1:INC AL
RMDCK2:MOV  BX,OFFSET CKPRS ;MONEY ORDER PRINTER-
                                            0=ENABLE,1=DISABLE
         CALL          WEEPRM
         INC           BX    ;JOURNAL PRINTER - 0=ENABLE,1=DISABLE
         CALL          WEEPRM
         INC           BX    ;KEYBOARD         - 0=ENABLE,1=LOCKED
         CALL          WEEPRM
         RET
RMDCK    ENDP
CODE     ENDS
         END

RO Assembler 03-06-84       Page 1-1

TITLE              KEYB - KEYBOARD MODULE
                Page        66,132

DATA      SEGMENT OUBLIC 'DATA'
```

```
        EXTRN   MOVP:BYTE  TOTS:BYTE   DSPR:BYTE    SHFT:BYTE FEEC:BYTE
        EXTRN   KEY:BYTE   KEYP:BYTE   KEYT:BYTE    KEYD:BYTE
        EXTRN   KNDG:BYTE  KCMD:BYTE   KPCMD:BYTE
        EXTRN   KENTN:BYTE KENTP:WORD
        EXTRN   KNBR:BYTE  KFLD:BYTE   KLCK:BYTE
        EXTRN   KDSP:BYTE  KONT:BYTE   KTPE:BYTE
        EXTRN   KLLMT:DWORD            KULMT:DWORD
        EXTRN   KPTR:DWORD KBIN:DWORD  KBPTR:DWORD

EXTRN   CHR:BYTE   CMIN:BYTE   CSEC:BYTE
        EXTRN   CSCRTY:WORD
        EXTRN   CSACC:DWORD            CXNBR:DWORD CSCHK:BYTE
        EXTRN   CID:BYTE   CIDL:BYTE
        EXTRN   CCNT:WORD  CAMT:DWORD  DFEE:DWORD  CTOT:DWORD
        EXTRN   DFIDT:DWORD
        EXTRN   CMCNT:WORD CMAMT:DWORD
        EXTRN   CVCNT:WORD CVAMT:DWORD
        EXTRN   CTCNT:WORD CTAMT:DWORD
        EXTRN   KBFR:BYTE  DBFR:BYTE   SCRTCH:BYTE
DATA    ENDS

EPRM    SEGMENT PUBLIC 'EPRM'
        EXTRN   SCRTY:WORD
        EXTRN   STACC:WORD STSTE:BYTE STSUB:BYTE  STDIV:WORD STSTR:WORD
        EXTRN   MONTH:BYTE DATE:BYTE  YEAR:BYTE
        EXTRN   PHONE:BYTE
        EXTRN   USE:BYTE              ID:BYTE
        EXTRN   FEELMT:DWORD          FEEAMT:DWORD
        EXTRN   MCNTC:WORD            MCNTM:WORD
        EXTRN   MAMTC:DWORD           MAMTM:DWORD
        EXTRN   VCNTC:WORD            VCNTM:WORD
        EXTRN   VAMTC:DWORD           VAMTM:DWORD
        EXTRN   BLANKS:BYTE           TRANS:BYTE  LOOK:BYTE
        EXTRN   BSACC1:WORD   BSNBS1:DWORD     BSCHK1:BYTE
        EXTRN   ESACC1:WORD   ESNBR1:DWORD     ESCHK1:BYTE
        EXTRN   BSACC2:WORD   BSNBR2:DWORD     BSCHK2:BYTE
        EXTRN   ESACC2:WORD   ESNBR2:DWORD     ESCHK2:BYTE
        EXTRN   RMODS:BYTE    MODMS:BYTE       CKPRS:BYTE
        EXTRN   JRPRSLBYTE    KEYBS:BYTE       LOCKS:BYTE
EPRM    ENDS

CODE    SEGMENT PUBLIC 'CODE'
        EXTRN   PWRON:NEAR
        EXTRN   WEEPRM:NEAR
        EXTRN   TRNS:NEAR
        EXTRN   DISP:NEAR  JPRT,NEAR  CPRT:NEAR
        EXTRN   ASCBN:NEAR BNASC:NEAR
        EXTRN   DPCMP:NEAR DPADD:NEAR DPSUB:NEAR  DPMUL:NEAR  DPDIV:NEAR
CODE    ENDS

DGROUP  GROUP     CODE, CONST, RESET
        DGROUP  GROUP     INIV. STACK DATA

CODE SEGMENT PUBLIC 'CODE'

RO Assembler 03-06-84        Page 1-2

ASSUE CS:CGROUP, DS:GROUP, SS:DGROUP, ES:EGROUP

;KEYBOARD CONSTANTS

NID     EQU     20              ;NUMBER OF IDENTIFICATION CODES
NFEE    EQU     20              ;NUMBER OF FEES
NTR     EQU     16              ;NUMBER OF TRANSACTIONS PER
                                 CUSTOMER/VENDOR
SKBFR   EQR     16              ;SIZE OF KEYBOARD BUFFER
SDBFR   EQU     16              ;SIZE OF DISOLAY BUFFER
KBDCS   EQU     300H            ;KEYBOARD COMMAND/STATUS ADDRESS
KBDCD   EQU     00DH            ;PORT A & C OUTPUT, B INPUT
KBDRS   EQU     0FBH            ;ROW 1 SELECT
KBDRM   EQU     00FH            ;READ MASK
KNKEY   EQU     24              ;NUMBER OF KEYS
KNROW   EQU     6               ;NUMBER OR ROWS
```

```
KNCOL    EQU    4              :NUMBER OF COLUMNS
KDBNC    EQU    4              :BEBOUNCE CONSTANT
KBYTE    EQU    1              :BYTE ENTRY
KWORD    EQU    2              :WORD ENTRY
KDWRD    EQU    3              :DWORD ENTRY
KREAL    EQU    4              :REAL ENTRY
KALPHA   EQU    5              :ALPHA ENTRY
KEY0     EQU    00H            :0
KEY1     EQU    01H            :1
KEY2     EQU    02H            :2
KEY3     EQU    03H            :3
KEY4     EQU    04H            :4
KEY5     EQU    05H            :5
KEY6     EQU    06H            :6
KEY7     EQU    07H            :7
KEY8     EQU    08H            :8
KEY9     EQU    09H            :9
KEVEN    EQU    0AH            :ENTER
KEVVD    EQU    0BH            :VOID
KEYST    EQU    0CH            :START
KEYNF    EQU    0DH            :NO FEE
KEYID    EQU    0EH            :ID
KEYMO    EQU    0FH            :MONEY ORDER
KEYTX    EQU    10H            :TRANSMIT
KEYDF    EQU    11H            :DEFINE
KEYVP    EQU    12H            :VENDOR PAYMENT
KEYTO    EQU    13H            :TOTAL
KEYLD    EQU    14H            :LOAD
KEYDY    EQU    15H            :DAY/SHIFT
KEYDS    EQU    16H            :DISPLAY
KEYBR    EQU    17H            :PRINT
KEYDATA  DB     KEYLD          :KEY CODE TABLE
         DB     KEYDY
         DB     KEYDS
         D      KEYPR
         DB     KEYTX
         DB     KEYDF
         DB     KEYBP
         DB     KEYTO
         DB     KEYST
         DB     KEYNF
         DB     KEYID
         DB     KEYMO
         DB     KEY6
         DB     KEY3
         DB     KEYEN
```

CRO Assembler 03-06-84        Page 1-3

```
         DB     KEY8
         DB     KEY5
         DB     KEY2
         DB     KEY0
         DB     KEY7
         DB     KEY4
         DB     KEY1
         DB     KEYVD
KEYJT    DW     KENT           :KEYBOARD JUMP TABLE
         DW     KVOID
         DW     KSTRT
         DW     KNFEE
         DW     KID
         DW     KMO
         DW     KTRNS
         DW     KDEFN
         DW     KVP
         DW     KTOTL
         DW     KLOAD
         DW     KSHFT
         DW     KDISP
         DW     KPRNT
:DATA ENTRY AND DISPLAY TABLES
:NUMBER OF DATA ITEMS TO BE ENTERED
```

```
;16 CHARACTER DISPLAY
;NUMBER OF POSSIBLE ENTRIES PER DATA ITEM
;NUMBER OF FIELDS
;NUMBER OF ERRONEOUS ENTRIES BEFORE RMOD LOCKS
;DISPLAY START OF ENTRY - 0=NO DISPLAY
;NUMBER OF CHARACTERS PER DISPLAY - 0=NONE ALLOWED
;TYPE OF DATA - 1=BYTE, 2=WORD, 3=DWORD, 4=REAL, 5=ALPHA
;LOWER LIMIT - 0=NO LIMIT CHECK, FFFFFFFF=CHECK AGAINST ARRAY
         IN UPPER LIMIT
;UPPER LIMIT
;DATA STORAGE POINTER
KSTRTN   EQU     2                       ;START OF DAY KEYBOARD DATA
KSTRTD   DB      'ID              ',20,1,5

DB      14,3,1
         DD      0FFFFFFFFH,ID
         DD      CIDL
         DB      'BEG#            ',1,3,0

DB      6,3,2
         DD      0FFFFFFFFH,BSACC1
         DD      CSACC
         DB      9,6,3
         DD      0FFFFFFFFH,DBNBR1
         DD      CSNBR
         DB      16,12,1
         DD      0FFFFFFFFH,BSCHK1
         DD      CSCHK
         DB      0,5,2
```

Assembler 03-06-84          Page 1-4

```
         DD      0FFFFFFFFH,SCRTY
         DD      CSCRTY'    DB
'DIAL TELELPHOHE #',0,0,0

DB      0,0,0
         DD      0,0

DD      TRNS
         DB      'DISCONNECT RMOD ',0,0,0

DB      0,0,0
         DD      0,0

DD      0
EFNN     EQU     19                      ;DEFINE KEYBOARD DATA-ENTERED BY
                                          MANAGER
EFND     DB      'SECURITY#       ',1,1,0

DB      0,5,2
         DD      0,0

DD      SCRTY
         DB      'ST              ',1,5,0

DB      3,3,2
         DD      0,0

DD      STACC
         DB      6,2,1
         DD      0,0

DD      STSTE
         DB      8,2,1
         DD      0,0

DD      STSUB
         DB      10,3,2
         DD      0,0

DD      STDIV
         DB      13,4,2
         DD      0,0
```

```
        DD      STSTR
        DB      'DATE        /  / ',1,3,0
        DD      MONTH
        DB      12,2,1
        DD      1,31
```

0 Assember 03-06666-84        Page 1-5

```
        DD      DAY
        DB      15,2,1
        DD      0,0

DD      YEAR
        DB      'TIME        :  : ',1,3,0

DB      9,2,1
        DD      0,24

DD      CHR
        DB      12,2,1
        DD      0,59

DD      CMIN
        DB      15,2,1
        DD      0,59

DD      CSEC
        DB      'PHNE        ',1,1,0

DB      6,11,5
        DD      0,0

DD      PHONE
        DB      'ID USE      ',1,1,0

DB      16,1,1
        DD      0,2

DD      USE
        DB      'ID          ',20,1,0

DB      14,3,1
        DD      0,255

DD      ID
        DB      'FE          ',20,2,0

DB      2,3,4
        DD      0,99999999

DD      FEELMT
        DB      12,4,4
        DB      'CST MO#     ',0,1,0
```

D Assembler 03-06-84        PAGE 1-6

```
        DB      12,5,2
        DD      0,0

DD      MCNTC
        DB      'MCH MO#     ',0,1,0

DB      12,5,2
        DD      0,0

DD      MCNTM
        DB      'CST MO$     ',0,1,0

DB      8,8,4
        DD      0,0
```

```
        DD      MAMTC
        DB      'MCH MO$     ',0,1,0

DB      8,8,4
        DD      0,0

DD      MAMTM
        DB      'VND  CK#    ',0,1,0

DB      12,5,2
        DD      0,0

DD      VCNTC
        DB      'MCH CK#     ',0,1,0

DB      12,5,2
        DD      0,0

DD      VCNTM
        DB      'VND CK$     ',0,1,0

DB      8,8,4
        DD      0,0

DD      MAMTC
        DB      'MCH CK$     ',0,1,0

DD      0.0

DD      VAMTM
```

```
        DB      'WARN # BLANKS  '0,1,0

DB      15,2,1

DD      0,0
        DB      'WARN # TRANS   '0,1,0

DB      15,2,1
        DD      0,0

DD      TRANS
        DB      'LOCK # ERRORS  '0,1,0

DB      15,2,1
        DD      0,0

DD      LOCK
KLOADN  EQU     3
KLOADD  DB      'SECURITY #      '1,1,5

DB      0,5,2
        DD      0FFFFFFFFH,SECRTY
        DD      CSCRTY
        DB      'BEG#            '1,3,0

DB      6,3,2
        D       0FFFFFFFFH,STACC
        DD      BSACC2
        DB      9,6,3
        DD      0,0

DD      BSNBRS2
        DB      16,1,1
```

```
            DD          0,0

DD          BSCHK2
            DB          'END#'           '1,3,0

DB          6,3,2
            DD          0FFFFFFFFH,STACC
            DD          SACC2
            DB          9,6,3
            DD          0,0
RO Assembler 03-06-84                PAGE 1-9

KEYBOARD MONITOR PRCEDURE

PAGE
;KEYBOARD MONITOR PROCEDURE
            PUBLIC      KEYB
KEYB        PROC        NEAR
            MOV         AL,KEYBS         ;$$$SECURITY CHECK$$$
            XDR         AL,AL
            JNZ         KEYB0            ;$$$KEYBOARD LOCKED$$$
            CALL        KEYSC            ;SCAN KEYBOARD FOR KEY
                                         DEPRESSED
            CMP         AL,KNKEY
            JL          KEYB1
KEYB0:      RET                          ;NO KEY OR NON-EXIST KEY
KEYB1:      XDR         CX,CX
            CMP         AL,10
            JL          KNMBR            ;NUMBER 0-9
            XCHG        KCMD,AL          ;ROTATE COMMANDS
            MOV         KPCMD,AL         ;SAVE PREVIOUS COMMAND
            SUB         AL,10
            MOV         CL,AL
            PUSH        CX               ;SAVE JUMP TABLE INDEX
            MOV         CL,KCNT          ;NUMBER OF DIGITS ALLOWED
            CMP         KNDG,0           ;NUMBER OF DIGITS ENTERED
            JZ          KEYB4            ;NO DATA ENTERED
            MOV         DI,KPTR          ;OFFSET OF DATA STORAGE IF ANY
            MOV         SI,OFSET KBIN    ;TEMPORARY BINARY STORAGE
            MOV         BX,OFFSET SCRTCH
            MOV         AX,KBPTR         :OFFSET OF DATA ENTERED
            CMP         KTPE,KALPHA      ;CHECK DATA TYPE
            JE          KEYB2            ;ALPHA
            PUSH        AX               ;SAVE KEYBOARD BUFFER ADDRESS
            PUSH        SI
            PUSH        BX
            PUSH        CX
            CALL        ASCBN            ;CONVERT TO BINARY
            PUSH        SI               ;POINTER TO CONVERTED BINARY
                                         NUMBER
            MOV         AX,OFFSET KLLMT
            PUSH        AX               ;LOWER LIMIT
            CALL        DRCMP            ;COMPARE
            SAL         AX,1
            JC          KEYB5            ;ERROR-NUMBER/LOWER LIMIT
            MOV         AX,OFFSET KULMT
            PUSH        AX               ;UPPER LIMIT
            PUSH        SI               ;CONVERTED BINARY NUMBER
            CALL        DPCMP            ;COMPARE
            SAL         AX,1
            JC          KEYB5            ;ERROR-UPPER LIMIT/NUMBER
            MOV         CL,KTPE
            CMP         CL,KDWRD
            JNE         KEYB2
            INC         SX               ;ADJUST DWORD COUNT
KEYB2:      MOV         AX,DS            ;TRANSFER DATA ENTERED
            CMP         KPTR+2,AX
            JE          KEYB3            ;DESTINATION=EE PROM
            MOV         BX,KPTR
KEYB2A      LODSB
            CALL        WEEPRM           ;DESTINATION=EE PROM
            INC         BX
            LOOP        KEYB2A
```

```
KEBY3:   OR      AX,AX
         JE      KEYB4           ;NO TRANSFER, LEAVE IN KBIN
REP      MOVSB
```

KEYBOARD MONITOR PROCEDURE

```
KEYB4:   POP     BX              ;RETRIEVE JUMP TABLE INDEX
         SHL     BX,1            ;COMPUTE JUMP ENTRY
         JMP     KEYJT [BX]      ;PROCESS KEY
KEYB5:   POP     BX
         CALL    KERR
         RET
KNMBR:   ADD     AL,30H          ;CONVERT TO ASCII
         CLD
         MOV     SI,OFFSET KBFR+1
         MOV     DI,OFFSET KBFRR
MOV      CX,SKBFR-1
REP      MOVSB                   ;ROTATE KBFR TO LEFT
         STOSB                   ;ADD NEW CHARACTER TO RIGHT
         INC     KNDG            ;DIGIT COUNT
         CMP     KDSP,0          ;CHECK FOR DISPLAY
         JZ      KNMBR3          ;NO DISPLAY ALLOWED
         MOV     DI,OFFSET DBFR-1
         XOR     CH,CH
         MOV     CL,KDSP
         ADD     DI,CX
         MOV     SI,OFFSET KBFR+SKBFR
         MOV     CL,KCNT
         SUB     SI,CX
         MOV     KBPTR,SI        ;SAVE KBFR OFFSET
         PUSH    DI              ;SAVE START OF DISPLAY
         PUSH    CX              ;SAVE NUMBER OF CHARACTERS IN
                                  DISPLAY
         MOV     BL,KTPE         ;TUPE OF ENTRY BEING PROCESSED
         CMP     BL,KREAL
         JNE     KNMBR1
         POP     CX
         INC     CX              ;ADD DECIMAL POINT TO COUNT
         PUSH    CX
         SUB     CX,3            ;REAL ENTRY
KNMBR1:
REP      MOVSB                   ;MOVE KBFR TO DBFR
         CMP     BL,KREAL        ;CHECK FOR REAL ENTRY
         JNE     KNMBR2
         MOV     AL,','          ;REAL ENTRY
         STOSB
         MOV     CL,2            ;MOVE FRACTION
REP      MOVSB
KNMBR2:  MOV     AK,DKSP         ;START OF MESSAGE (1-16)
         MOV     AL,05H          ;CURSOR LINE, ON
         PUSH    AX
         CALL    DISP
KNMBR3:  RET
KENTR:   NGP                     ;ENTER KEY - $$$NO PROGRAM$$$
KVOID:   MOV     AH,MOVP         ;VOID KEY
         MOV     AL,TOTS         ;TOTAL STATUS
         CMP     AH,1
         JE      KOID1           ;MONEY ORDER VOID
         CMP     AH,2
         JE      KVPOID2         ;VENDOR PAYMENT VOID
         CALL    KERR            ;ERROR-CLEAR ENTRY & BEEP
         RET
KVOID2:  MOV     SI,OFFSET CVCNT ;VENDOR PAYMENT VOID
         MOV     DI,OFFSET CVAMT
KVOID3:  BX,BX                   ;CAMT,CFEE INDEX
```

KEYBOARD MONITOR PROCEDURE

```
         MOV     CX,CCNT         ;# OF MO/VP ENTERED
         CMP     AL,0
```

```
            JNE     KVOID4              ;TOTAL KEY DEPRESSED, VOID
                                         ALL
            MOV     AL,4                ;VOID LAST ENTRY
            DEC     CL
            MUL     CL
            MOV     BX,AX
            MOV     CL,1
KVOID4:     PUSH    CX                  ;# OF ENTRIES TO BE VOIDED
KVOID5:     DEC     CCN                 ;REDUCE COUNT
            DEC     CVCNT
            CMP     TOTS,1
            JNZ     KVOID6
            DEC     CTCNT               ;REDUCE TOTAL TRANSACTIONS
KVOID6:     LOOP    KVOID5
            POP     CX
            PUSH    CX
            PUSH    DI                  ;SAVE CMAMT/CVAMT OFFSET
KVOID7:     MOV     SI,OFFSET CAMT
            ADD     SI,BX
            MOV     DI,OFFSET CTOT
            PUSH    SI
            PUSH    DI
            CALL    DPSUB               ;CTOT=CTOT-MO/VP
            CMP     MOVP,1
            JNE     KVOID9
            PUSH    SI                  ;REDUCE FEES
            CMP     TOTS,0
            JE      KVOID8
            MOV     SI,OFFSET CFEE      ;SUBTRACT FEE FROM CTOT
            ADD     SI,CX
            PUSH    SI
            PUSH    DI
            CALL    DPSUB               ;CTOT=CTOT-CFEE
KVOID8:     XOR     AX,AX               ;ZERO FEE
            MOV     [SI],AX
            MOV     [SI+2],AX
            POP     SI
KVOID9:     POP     DI
            POP     SI
            PUSH    DI
            CALL    DPSBU               ;CMAMT/CVAMT=CMAMT/CVAMT-MO/VP
            PUSH    DI
            CMP     TOTS,1
            JNZ     KVOID10
            MOV     DI,OFFSET CTAMT     ;REDUCE TOTAL AMOUNT
            PUSH    SI
            PUSH    DI
            CALL    DPSUB
KVOID10:    POP     DI
            XOR     AX,AX
            MOV     [SI],AX             ;ZERO CAMT
            MOV     [SI+2],AX
            INC     BX
            INC     BX
            JZ      KSTRT1              ;SECOND START KEY
            CALL    PWRON               ;POWER ON
            RET

RO Assembler 03-06-84           Page 1-12

KEYBOARD MONITOR PROCEDURE

KSTRT1:     MOV     AL,KSTRTN           ;START DATA
            MOV     SI,OFFSET KSTRTD
            CALL    KINIT               ;INITIALIZE KEYBOARD AND
                                         DISPLAY VARIABLES
            RET
KNFEE:      MOV     FEEC,1              ;NO FEE KEY - FECC=1
            RET
KID:        MOV     SI,OFFSET KBIN      ;ID KEY
            LODSB
            MOV     CID,AL
            PUSH    ES                  ;CHECK FOR VALID ID
            MOV     AX,EPRM
```

```
                MOV     DI,OFFSET ID        ;EEPROM ADDRESS
                MOV     CX,NID              ;NUMBER OF IDS
                REPNE   SCASB
                POP     ES
                JB      KID1
                MOV     CID,0               ;ZERO CURRENT ID
                CALL    KERR                ;ERROR-WIPE OUT ENTRY AND
                                             BEEP
KID1:           RET                         ;MATCH FOUND
KMO:            MOV     SI,OFFSET KBIN      ;MONEY ORDER KEY
                MOV     DI,OFFSET CTOT
                PUSH    SI
                PUSH    DI
                CALL    DPADD               ;CTOT=CMAMT+AMT ENTERED
                MOV     DI,OFFSET CMAMT
                PUSH    SI
                PUSH    DI
                CALL    DPADD               ;CMAMT=CMAMT+AMT ENTERED
                PUSH    ES
                MOV     AX,EPRM
                MOV     ES,AX
                MOV     DI,OFFSET MONTC     ;EEPROM ADDRESS
                MOV     AX,CCNT
                CMP     AX,NTR              ;CHECK NUMBERS
                JGE     KMOE                ;MONEY ORDERS EXCEEDED PER
                                             SYSTEM
                CMP     AX,ES:WORD PTR[DI]
                JGE     KMOE                ;MONEY ORDERS EXCEEDED PER
                                             MACHINE
                MOV     SI,OFFSET CTOT      ;CHECK AMOUNT PER CUSTOMER
                ADD     DI,2
                PUSH    SI
                PUSH    DI
                CALL    DPCMP               ;COMPARE TWO DOUBLE
                                             PRECISION NUMBERS
                CMP     AL,1
                JE      KMO4                ;CTOT MAX AMT PER CUSTOMER
                MOV     SI,OFFSET CMAMT     ;CHEC AMOUNTS PER MACHINE
                ADD     DI,4
                PUSH    SI
                PUSH    DI
                CALL    DPCMP               ;COMPARE TWO DOUBLE
                                             PRECISION NUMBERS
                CMP     AL,1
KMOE:           POP     ES                  ;KEYBOARD ERROR
                CALL    KERR                ;ERROR - CLEAR ENTRY & BEEP

RO Assembler 03-06-84                Page 1-13

KEYBOARD MONITOR PROCEDURE

KMOO:           MOV     MOVP,1              ;MO/VP INDICATOR
                INC     CONT
                INC     CMONT
                MOV     AL,4
                MUL     BL
                MOV     BX,AX               ;CAMT & CFEE INDEX
                MOV     AX,KBIN             ;LOW BYTES OF MO
                MOV     CAMT[BX],AX
                MOV     AX,KBIN+2           ;HIGH BYTES OF MO
                MOV     CAMT[BX],AX
                MOV     AL,FEEC             ;CHECK IF FEE IS TO BE
                                             COMPUTED
                CMP     AL,0
                JE      KMO3                ;NO FEE
                PUSH    ES
                MOV     AX,EPRM
                MOV     ES,AX
                MOV     SI,OFFSET KBIN      ;FIND FEE
                MOV     DI,OFFSET FEELMT-9
                MOV     CX,NFEE
```

```
KMO1:    ADD    DI,B              ;$$$ORDER CHANGED$$$
         PUSH   SI
         PSUH   DI                ;$$$WRONG SEGMENT$$$
         CALL   DPCMP             ;COMPARE TWO DOUBLE
                                   PRECISION NUMBERS

CMP    AX,1
         JNE    KMO2              ;FEE FOUND-MONEY ORDER
                                   $<=$BREAKPOINT
         LOCP   KMO1              ;NEXT FEE
KNO2:    ADD    DI,4              ;FEE ADDRESS
         MOV    AX,ES:WORD PTR[DI]
         MOV    CFEE[BX],AX
         ADD    DI,2
         MOV    AX,ES:WORD PTR[DI]
         MOV    CFEE+2OBX1,AX
         POP    ES
KMO3:    RET
KMO4:    POP    ES                ;AMOUNTS EXCEEDED-SUBTRACT
                                   LAST AMOUNTS
         MOV    SI,OFFSET KBIN
         MOV    DI,OFFSET CTOT
         PUSH   SI
         PUSH   DI
         PUSH   SI
         CALL   DPSUB             ;CTOT=CMAMT=-AMT ENTERED
         PUSH   ES
         CALL   DPSUB             ;CMAMT=CMAMT-AMT ENTERED
         PUSH   ES
         JMP    KMOE              ;ERROR
KTRNS:   MOV    AL,KTRNSN         ;TRANSMIT KEY
         MOV    SI,OFFSET KTRNSD
         CALL   KINIT             ;INITIALIZE KEYBOARD &
                                   DISPLAY VARIABLES
         RET
KDEFN:   MOV    AL,KDEFNN         ;DEFINE KEY
         MOV    SI,OFFSET KDEFND
         CAL    KINIT             ;INITIALIZE KEYBOARD &
                                   DISPLAY VARIABLES
         MOV    DI,OFFSET CTOT    ;ZERO CURRENT TOTAL
         XDR    AX,AX
         STOSW

RO Assembler 03-06-84             Page 1-14

KEYBOARD MONITOR PROCEDURE

STOSW
         MOV    AL,MOVP
         JE     KTOTL6            ;DISPLAY OR PRINT TOTALS
         CMP    AL,2
         JE     KTOTL3            ;VENDOR PAYMENT TOTAL
         CMP    AL,1
         JE     KTOTL1            ;MONEY ORDER TOTAL
         CALL   KERR
         RET
KTOTL1:  MOV    CX,CONT           ;MONEY ORDER TOTAL
         MOV    SI,OFFSET CFEE-4
         MOV    DI,OFFSET CTOT
KTOTL2:  ADD    SI,4              ;FEE ADDRESS
         PUSH   SI
         PUSH   DI
         CALL   DPADD             ;ADD UP ALL FEES
         LOOP   KTOTL2
KTOTL3:  MOV    CX,CCNT           ;SUM TOTAL TRANSACTIONS
         AD     CTCNT,CX
         MOV    SI,OFFSET CAMT-4
         MOV    DI,OFFSET CTOT
KTOTL4:  ADD    SI,4
         PUSH   SI
         PUSH   DI
         CALL   DPADD
         LOOP   KTOTL4
         PUSH   DI
         MOV    SI,OFFSET CTAMT
```

```
                PUSH    SI
                CALL    DPADD                   ;SUM MACHINE TOTAL
                MOV     SI,OFFSET MOTMSG        ;MO TOT
                CMP     MOVP,1
                JE      KTOTL5
                MOV     SI,OFFSET VPTMSG        ;VP TOT
KTOTL5:         MOV     DI,OFFSET DBFR
                PUSH    DI                      ;DBER ADDRESS FOR DISPLAY
                MOV     CX,7
REP             MOVS    ES:BYTE PTR[DI],CS:[SI]
                MOV     SI,OFFSET CTOT          ;CONVERT TO ASCII & DISPLAY
                MOV     CX,OFFSET SCRTCH
                MOV     AH,9
                MOV     AL,KREAL
                PUSH    SI
                PUSH    DI
                PUSH    CX
                PUSH    AX
                CALL    BNASC                   ;CONVERT TO ASCII
                MOV     AX,SDBFR
                PUSH    AX
                MOV     AX,120H                 ;BLINKING DISPLAY, NO CURSOR
                PUSH    AX
                CALL    DISP                    ;DISPLAY
                RET
KTOTL6:         NOR                             ;TOTAL DISPLAY/REPORTS-$$$NO PROGRAM$$$
                RET
KSHFT:          MOV     SHFT,1                  ;DAY/SHIFT KEY
                RET

RO Assembler 03-06-84           Page 1-15

KEYBOARD MONITOR PROCEDURE

KDISP:          MOV     DSPR,1                  ;DISPLAY KEY - DSPR=1
                RET
KPRNT:          MOV     DSPR,2                  ;PRINT KEY - DSPR=2
                MOV     AL,MOVP
                CMP     AL,0
                JNZ     KPRNT1                  ;MO/VP PRINT
                RET
KPRNT1:         MOV     AL,CKPRS                ;$$$ SECURITY CHECK $$$
                XOR     AL,AL
                JZ      KPRNT2                  ;OK TO PRINT MONEY
                                                 ORDERS/VENDOR PAYMENTS
                RET                             ;PRINTER DISABLED - IGNORE
                                                 PRINT COMMAND
KPRNT2:         NOP                             ;PRINT CHECK - $$$ NO PROGRAM
                                                 $$$
KEYB            ENDP
SUBTTL                  KEYBOARD INITIALIZATION PROCEDURE

PAGE 66,132
NAME                    RMOD_PRINT

;       ###############################################################
;       ###     PRINTER DRIVER FOR RMOD. THIS PROGRAM ACCEPTS STRING  ###
;       ###     DATA AND TRANSFORMS IT INTO A LIST OF "CELL SPECS     ###
;       ###     WHICH ARE SORTED AND PROCESSED TO GENERATE A LINE AT A ###
;       ###     TIME OF PIXEL DATA TO DRIVE THE FOUR PRINT SOLENOIDS  ###
;       ###     OF A _____ DOT MATRIX PRINTER                     ###
;       ###     THE ALGORITHM IS EXPLAINED IN A SEPARATE DOCUMENT     ###
;       ###     TITLED "_____"                                    ###
;       ###############################################################

STACK                   SEGMENT         PARA    STACK   'STACK'

STACK_BOTTOM            LABEL           WORD
                        ORG             OFFSET $+01FEH
STACK_TOP               LABEL           WORD
```

```
STACK              ENDS

DATA               SEGMENT    PARA    MEMORY  'DATA'

NEXT_CELL          LABEL      WORD
                   ORG        OFFSET $+2
TOTAL_CELLS        LABEL      WORD
                   ORG        OFFSET $+2
XCOORD             LABEL      WORD
                   ORG        OFFSET $+2
YCOORD             LABEL      WORD
                   ORG        OFFSET $+2
FONT               LABEL      BYTE
                   ORG        OFFSET $+1
DIRECT             LABEL      BYTE
                   ORG        OFFSET $+1
WDTH               LABEL      BYTE
                   ORG        OFFSET $+1
HEIGHT             LABEL      BYTE
                   ORG        OFFSET $+1
HSPACE             LABEL      BYTE
                   ORG        OFFSET $+1
VSPACE             LABEL      BYTE
                   ORG        OFFSET $+1
IPT_OFFS           LABEL      WORD
                   ORG        OFFSET $+2
HORIZ              LABEL      WORD
                   ORG        OFFSET $+2
VERT               LABEL      WORD
                   ORG        OFFSET $+2
CSPECS_START       LABEL      WORD
                   ORG        OFFSET $+2
ACTIVE_CELL_TABLE  LABEL      WORD
                   ORG        OFFSET $+(2*3*65)
ACTIVE_LIST        LABEL      WORD
                   ORG        OFFSET $+2
THIS_ENT           LABEL      WORD
                   ORG        OFFSET $+2
NEXT_ENT           LABEL      WORD
                   ORG        OFFSET $+2
FREE_LIST          LABEL      WORD
                   ORG        OFFSET $+2
BACK               LABEL      WORD
                   ORG        OFFSET $+2
FWD                LABEL      WORD
                   ORG        OFFSET $+2
NUMBER_ACTIVE      LABEL      BYTE
                   ORG        OFFSET $+1
SWAPPED            LABEL      BYTE
                   ORG        OFFSET $+1

;       THIS IS THE OUTPUT LINE BUFFER FOR SOLENOID DATA

BUFF               LABEL      BYTE              ; ROOM FOR 16 BYTES
                   ORG        OFFSET $+16       ; LAST 2 FOR OVERFLOW

BIT                LABEL      BYTE              ; HOLDS POSITION IN SCANLINE
                   ORG        OFFSET $+1
SCANLINE           LABEL      WORD              ; HOLDS CURRENT SCANLINE
                   ORG        OFFSET $+2
PR_SHADOW          LABEL      BYTE
                   ORG        OFFSET $+1
SOL                LABEL      BYTE              ; HOLDS VAL OF CURRENT
                   ORG        OFFSET $+1        ; SOLENOID
```

```
INSERTED            LABEL       WORD            ; NUMBER OF CSPECS WHICH
                    ORG         OFFSET $+2      ; HAVE BEEN MADE ACTIVE
NXT2CHK             LABEL       WORD            ; OFFSET OF NXT CSPEC
                    ORG         OFFSET $+2      ; TO EXAMINE

;       FOR SIMULATION PURPOSES THIS VARIABLE WILL REPRESENT
;       THE IO PORT WHICH CONTROLS THE PRINTER THIS WILL HAVE
;       TO BE CHANGED TO AN I/O INSTRUCTION WHICH WRITES TO AN
;       IO SEGMENT ADDRESS

PRINT_PORT          LABEL       BYTE
                    ORG         OFFSET $+1

;       TEST DATA- TO BE REMOVED AFTER DEBUGGING IS DONE
;       THIS SPECIFIES 3 STRINGS TO BE PRINTED

STRING_LIST         DB          3               ;3 STRING DESCRIPTORS
                    DW          OFFSET STRING1
                    DW          OFFSET STRING2
                    DW          OFFSET STRING3

STRING1             DW          0               ;X COORDINATE
                    DW          0               ;Y COORDINATE
                    DB          AFONT           ;STANDARD FONT
                    DB          DOWN            ;CHECK ORIENTATION
                    DB          3               ;CHARACTER COUNT
                    DB          'ABC'           ;THE STRING

STRING2             DW          0               ;X COORDINATE
                    DW          0               ;Y COORDINATE
                    DB          AFONT           ;STANDARD FONT
                    DB          RIGHT           ;RECEIPT ORIENTATION
                    DB          4               ;NUMBER OF CHARS
                    DB          'TX_J'          ;THE STRING

STRING3             DW          25              ;XCOORDINATE
                    DW          10              ;Y COORDINATE
                    DB          AFONT           ;STANDARD FONT
                    DB          LEFT            ;BACKWARDS DIRECTION
                    DB          2               ;CHAR COUNT
                    DB          'HI'            ;THIRD STRING

FREE_SPACE          LABEL       WORD            ;SHOULD BE ENOUGH SPACE
                    ORG         $+(50*8)        ;FOR 50 CELL SPECS
END_DATA            LABEL       WORD
DATA                ENDS

;****************************************************************
;EQUATES
;****************************************************************

MAX_ACTIVE_CELLS        EQU     64
SIZE_OF_ACT             EQU     65
CSPEC_SIZE_IN_BYTES     EQU     8

RIGHT                   EQU     0
LEFT                    EQU     1
UP                      EQU     2
DOWN                    EQU     3

;OFFSETS WITHIN AN ACTIVE CELL TABLE ENTRY.
```

```
ACT_CSPEC_INDEX         EQU         0
ACT_BACK_PTR            EQU         2
ACT_FWD_PTR             EQU         4

;OFFSETS WITHIN A CELL SPEC

CSPEC_SCANLINE          EQU         0
CSPEC_PMEMOFFS          EQU         2
CSPEC_WIDTH             EQU         4
CSPEC_HEIGHT            EQU         5
CSPEC_XBYTEOFFS         EQU         6
CSPEC_XBITOFFS          EQU         7

;OFFSETS WITHIN A FONT DESCRIPTOR

FDESC_WIDTH             EQU         0
FDESC_HEIGHT            EQU         1
FDESC_HSPACE            EQU         2
FDESC_VSPACE            EQU         3
FDESC_IPTOFFS           EQU         4

;OFFSETS WITHIN A STRING DESCRIPTOR

STDESC_XCOORD           EQU         0
STDESC_YCOORD           EQU         2
STDESC_FONT             EQU         4
STDESC_DIRECT           EQU         5
STDESC_COUNT            EQU         6
STDESC_CHARS            EQU         7

MAX_SCANS               EQU         700     ;NUM SCANLINES PER MONEY ORDR
BITS_PER_SCAN           EQU         240     ;WIDTH OF ONE SCANLINE IN DOTS

;EQUATES USED WITH PRINT SHADOW REGISTER      PR_SHADOW

SOL1                    EQU         01H
SOL2                    EQU         02H
SOL3                    EQU         04H
SOL4                    EQU         08H
NOT_SOLENOIDS           EQU         0F0H
MTRDRV                  EQU         010H
NOT_MTRDRV              EQU         0EFH
MTRSTP                  EQU         020H
NOT_MTRSTP              EQU         0DFH
CLAMP_ON                EQU         080H
CLAMP_OFF               EQU         07FH

AFONT                   EQU         0
BFONT                   EQU         1

CODE                    SEGMENT     WORD    PUBLIC 'CODE'

ASSUME      CS:CODE
            ASSUME      DS:DATA
            ASSUME      SS:STACK

;*****************************************************************
; DRIVER ROUTINE :   THIS IS FOR DEBUGGING-SHOULD COME OUT LATER
;*****************************************************************

TEST_STARTS:            MOV         AX,DATA
                        MOV         DS,AX
```

```
                MOV     AX,STACK         ;SET UP STACK SEG
                MOV     SS,AX
                MOV     SP,OFFSET STACK_TOP ;SET UP STK PTR

MOV     DX,OFFSET FREE_SPACE
                MOV     BX,OFFSET STRING_LIST
                CALL    PRNTR
TEST_DONE:      JMP     TEST_DONE
```

;***********************************************************

;END OF DEBUGGING CODE
;***********************************************************

;***********************************************************
;
;   THIS IS THE MAIN ENTRY POINT FOR THE WHOLE PRINTER DRIVER
;   PRNTR EXPECTS TWO PARAMETERS:
;
;          1. THE OFFSET OF THE STRING LIST TABLE SHOULD BE IN BX reg
;
;          2. THE OFFSET OF UNRESTRICTED WORKSPACE ABOVE ALL STRINGS
;             AND OTHER DATA SHOULD BE IN DX reg
;
;***********************************************************

```
PRNTR:      ;       PUSHA   ***** 80186 INST. ;SAVE ALL REGISTERS
                                        ; REPLACED BY THE FOLLOWING
                    PUSH    AX
                    PUSH    BX
                    PUSH    CX
                    PUSH    DX
                    PUSH    DS
                    PUSH    ES
                    PUSH    SS
                    PUSH    DI
                    PUSH    SI
                    PUSH    BP

MOV     AX,DATA       ;SET UP SEGMENT REGISTER
                    MOV     DS,AX
```

;   GET THE OFFSET OF UNRESTRICTED WORKSPACE IN WHICH WE MAY
;   BUILD THE TABLES. CALLER SHOULD SUPPLY THIS IN DX REGISTER

```
                    MOV     NEXT_CELL,DX  ;OFFSET OF FREE AREA IN DATA SEGMENT
                                          ; FOR TABLES
                    MOV     TOTAL_CELLS,0 ;COUNTER FOR CELL SPECS
                    MOV     CSPECS_START,DX ;SAVE ORIGIN OF CELL SPEC TABLE.

SUB     CX,CX
```

;   BX HOLDS OFFSET IN DATA SEGMENT OF STRING LIST

```
                    MOV     CL,[BX]       ;GET NUMBER OF STRINGS TO PROCESS
                    INC     BX            ;BX HOLDS OFFSET OF WORD HOLDING
                                          ;OFFSET OF FIRST STRING IN LIST
```
;   CHECK FOR ZERO STRINGS
```
                    CMP     CL,0
                    JG      DO_A_STRING
```

```
            JMP           LISTS_DONE

;*****************************************************************
; PROCESS EACH STRING IN THE STRING LIST. BX HOLDS THE OFFSET OF THE FIRST
; ENTRY IN THE STRING LIST TABLE. CL HOLDS THE NUMBER OF STRINGS TO PROCESS
; CSPECS_START HOLDS THE OFFSET OF THE AREA WHERE THE CELL SPECS WILL BE
; BUILT AND SORTED.
;*****************************************************************

DO_A_STRING:    MOV     DX,[BX]         ;DX HOLDS OFFSET OF NEXT STRING DESC
                INC     BX              ;MAKE BX POINT TO WORD HOLDING
                INC     BX              ;OFFSET OF NEXT STRING DESC AND
                PUSH    BX              ;SAVE ON STACK FOR NEXT LOOP

;       NOW LOAD PARAMETERS FOR CURRENT STRING

MOV     BX,DX           ;OFFSET OF CURRENT STRING DESC
                MOV     AX,[BX+STDESC_XCOORD]
                MOV     XCOORD,AX

MOV     AX,[BX+STDESC_YCOORD]
                MOV     YCOORD,AX

MOV     AL,[BX+STDESC_FONT]
                MOV     FONT,AL

MOV     AL,[BX+STDESC_DIRECT]
                MOV     DIRECT,AL

PUSH    BX              ;SAVE WHILE DOING NEXT

SUB     BX,BX           ;MULTIPLY FONT BY 6
                MOV     BL,FONT         ;TO MAKE IT AN INDEX
                SHL     BX,1            ;INTO THE FONT_SPEC_TABLE
                MOV     DX,BX
                SHL     BX,1
                ADD     BX,DX

;NOW GET THE PARAMETERS FOR THE FONT REQUESTED

ADD     BX,OFFSET FONT_SPEC_TABLE

MOV     AL,CS:[BX+FDESC_WIDTH]
                MOV     WDTH,AL         ; WIDTH IN BYTES

MOV     AL,CS:[BX+FDESC_HEIGHT]
                MOV     HEIGHT,AL       ; HEIGHT IN BITS

MOV     AL,CS:[BX+FDESC_HSPACE]
                MOV     HSPACE,AL

MOV     AL,CS:[BX+FDESC_VSPACE]
                MOV     VSPACE,AL

MOV     AX,CS:[BX+FDESC_IPTOFFS]
                MOV     IPT_OFFS,AX

;NOW INITIALIZE CUMULATIVE POSITIONERS

MOV     HORIZ,0
                MOV     VERT,0
```

```
                        POP         BX ; RESTORE OFFSET OF CURRENT STRING DESCRIPTOR
                        PUSH        CX ; SAVE STRING COUNTER

;SET UP REGISTERS TO LOOP THROUGH CHARACTERS OF CURRENT STRING

MOV         SI,NEXT_CELL
                        ADD         BX,STDESC_COUNT  ;BX IS OFFSET OF CHARACTER COUNT
                        SUB         CH,CH
                        MOV         CL,[BX]          ;LOOP COUNT = NUMBER OF CHARS

DO_A_CHAR:              INC         BX               ;POINT TO CURRENT CHAR
                        SUB         AX,AX
                        MOV         AL,[BX]          ;GET THE CHAR
                        PUSH        BX               ;SAVE PTR FOR NEXT LOOP
                        SHL         AX,1
                        ADD         AX,IPT_OFFS      ;POINT TO IPT ENTRY FOR CHAR
                        MOV         BX,AX
                        MOV         AX,CS:[BX]       ;GET FONT MEM OFFSET FOR CHAR

;NOW BUILD THE CELL SPEC POINTED TO BY SI REG

MOV         [SI+CSPEC_FMEMOFFS],AX  ;FMEM OFFSET

MOV         AX,YCOORD
                        ADD         AX,VERT
                        MOV         [SI+CSPEC_SCANLINE],AX  ;CHAR ORIGIN SCANLINE

MOV         AX,XCOORD
                        ADD         AX,HORIZ
                        MOV         DX,AX
                        AND         AX,0007H
                        MOV         [SI+CSPEC_XBITOFFS],AL  ;CHAR ORIGIN BIT REMAINDER

SHR         DX,1
                        SHR         DX,1
                        SHR         DX,1
                        MOV         [SI+CSPEC_XBYTEOFFS],DL ;CHAR ORIGIN MOD BYTE

MOV         AL,WIDTH
                        MOV         [SI+CSPEC_WIDTH],AL     ;CHAR WIDTH IN BYTES

MOV         AL,HEIGHT
                        MOV         [SI+CSPEC_HEIGHT],AL    ;CHAR HEIGHT IN BITS

;###############################################################
; NOW CHECK DIRECTION TO COMPUTE CUMULATIVE POSITIONERS FOR NEXT
; CHARACTER THE DRAWING SHOWS THE PRINT ORIENTATIONS
;###############################################################
```

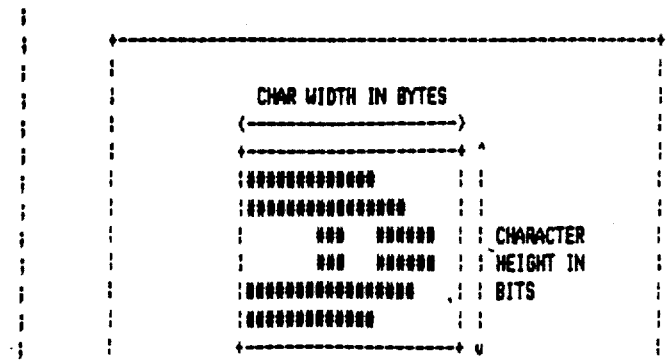

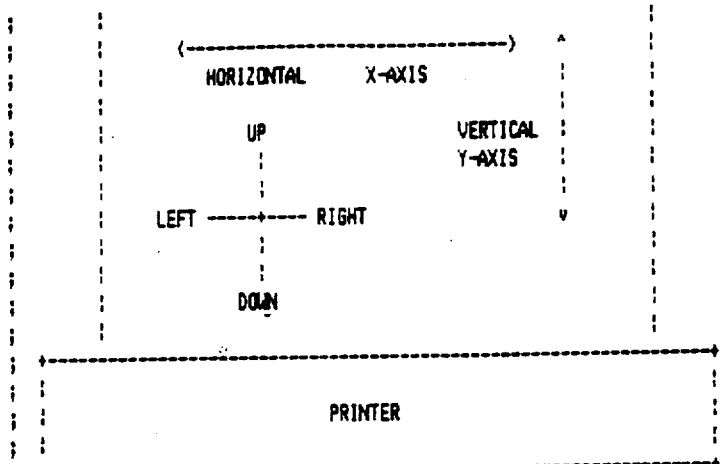

```
;                  <-------------------------->    ^
;                        HORIZONTAL    X-AXIS      :
;                                                  :
;                           UP               VERTICAL :
;                            :               Y-AXIS   :
;                            :                     :
;              LEFT -------+------ RIGHT           :
;                            :                     :
;                            :                     v
;                          DOWN
;
;        +--------------------------------------------+
;        :                                            :
;        :                  PRINTER                   :
;        :                                            :
;        +--------------------------------------------+
;
;
;     NORMAL ORIENTATION FOR CHECK PRINTING IS "DOWN"
;
;     NORMAL ORIENTATION FOR RECEIPTS WOULD BE "RIGHT"
;
;
;                       #####...   ^  ^
;  FONT0:               ..#..#..   :  :
;                       ..#...#.   5  :
;  Letter "A"           ..#...#.   :  7   CHAR WIDTH IN BYTES   = 1
;                       ..#..#..   :  :   CHAR HEIGHT IN BITS   = 5
;                       #####...   v  :   HORIZ SPACING IN BITS = 10
;                                     :   VERT SPACING IN BITS  = 7
;                                     ^
;                      (------)
;                       1 BYTE
;
;                      (-- 10 --)
;
;##################################################################

TRY_RIGHT:        CMP        DIRECT,RIGHT    ;NORMAL, SO TRY THIS FIRST TO SAVE TIME
                  JNE        TRY_UP          ;NOT RIGHT- GO ON
DO_RIGHT:         MOV        AL,HSPACE       ;NORMAL ORIENTATION ON A RECEIPT
                  ADD        HORIZ,AX        ;NEXT CHAR IN THIS STRING WILL BE PLACED
                  JMP        CSPEC_DONE      ;THIS CHARACTER'S HORIZONTAL SPACING
                                             ;TO THE RIGHT OF THIS CAHRACTER

TRY_UP:           CMP        DIRECT,UP
                  JNE        TRY_LEFT
DO_UP:            MOV        AL,VSPACE       ;NEXT CHAR WILL BE PLACED THIS
                  SUB        VERT,AX         ;CHARS VERTICAL SPACING ABOVE
                  JMP        CSPEC_DONE      ;THIS CHARACTER

TRY_LEFT:         CMP        DIRECT,LEFT     ;UPSIDE DOWN & BACKWARDS PRINTING
                  JNE        DO_DOWN
DO_LEFT:          MOV        AL,HSPACE       ;NEXT CHAR WILL BE PLACED THIS
                  SUB        HORIZ,AX        ;CHAR'S HORIXONTAL SPACING TO THE
                  JMP        CSPEC_DONE      ;LEFT OF THIS CHARACTER

DO_DOWN:          MOV        AL,VSPACE       ;NEXT CHAR WILL BE PLACED THIS
                  ADD        VERT,AX         ; CHAR'S VERTICAL SPACING BELOW
                                             ;THIS CHARACTER. NORMAL
                                             ; ORIENTATION FOR CHECK

CSPEC_DONE:       ADD        SI,CSPEC_SIZE_IN_BYTES
                  INC        TOTAL_CELLS
                  POP        BX              ;RESTORE OFFSET OF
```

```
                    DEC         CX                      ;THIS CHAR IN
                    JZ          STRING_DONE             ;STRING DESCRIPTOR
                    JMP         DO_A_CHAR

STRING_DONE:        POP         CX                      ;RESTORE STRING LOOP CTR
                    POP         BX                      ;RESTORE OFFSET OF
                    MOV         NEXT_CELL,SI            ;SAVE THE OFFSET
                    DEC         CX                      ;NEXT SLOT IN STRING
                    JZ          SORT_CSPECS             ;TABLE
                    JMP         DO_A_STRING
```

```
;***************************************************************
; IN-PLACE BUBBLE SORT OF CSPEC LIST INTO ASCENDING ORDER BASED ON
; CONTENTS OF 1ST WORD IN EACH CELL SPEC
;***************************************************************
```

```
SORT_CSPECS:        MOV         CX,TOTAL_CELLS
                    DEC         CX                      ;OUTER LOOP IS DONE n - 1 TIMES
I_LOOP:             PUSH        CX                      ;SAVE OUTER LOOP COUNTER

MOV         BX,CSPECS_START         ;BEGINNING OF TABLE TO SORT
                    MOV         SWAPPED,0               ;SET FLAG CLEAR FOR NEXT INNER LOOP
                    MOV         CX,TOTAL_CELLS          ;INNER LOOP IS DONE n - 2
                    SUB         CX,2                    ;TIMES
J_LOOP:             PUSH        CX                      ;SAVE INNER LOOP COUNTER
                    MOV         AX,[BX]                 ;COMPARE ACT_CSPEC_INDICES FOR
                    CMP         AX,[BX+8]               ;TWO ADJACENT CELLS. IF OUT OF
                    JNG         NO_SWAP                 ;ORDER, THEN SWAP THEIR CONTENTS
SWAP:               PUSH        CX                      ;SAVE INNER LOOP COUNTER
                    MOV         CX,CSPEC_SIZE_IN_BYTES/2 ;LOOP HERE ONCE FOR EACH
                                                        ;WORD IN A CELL SPEC
SWAP_LOOP:          MOV         AX,[BX]                 ;GET THE WORDS TO SWAP
                    MOV         DX,[BX+8]
                    MOV         [BX],DX                 ;PUT THEM BACK IN SWAPPED
                    MOV         [BX+8],AX               ;POSITIONS
                    ADD         BX,2
                    LOOP        SWAP_LOOP

POP         CX

MOV         SWAPPED,1               ;SET FLAG SAYING AT LEAST ONE SWAP
                                                        ;IN THRU INNER LOOP
                    JMP         NEXT_J

NO_SWAP:            ADD         BX,8                    ;ADJUST POINTER UP ONE CELLSPEC

NEXT_J:             POP         CX                      ;RESTORE INNER LOOP COUNTER

LOOP        J_LOOP

CMP         SWAPPED,0               ;IF FLAG WAS SET, SWAPS WERE MADE
                    JNE         NOT_DONE                ;AND WE ARE NOT DONE
                    POP         CX                      ;BUT IF FLAG WAS NOT SET,
                                                        ;RESTORE STACK
                    JMP         LISTS_DONE              ;AND GET OUT OF SORT ROUTINE

NOT_DONE:           POP         CX                      ;RESTORE OUTER LOOP COUNTER
                    LOOP        I_LOOP
```

```
;***************************************************************
; CELL SPEC LIST IS SORTED AND READY TO PROCESS SEQUENTIALLY
```

```
; NOW FIRE UP THE PRINTER, BUILD SCANLINES, AND PRINT IT ALL
;************************************************************

LISTS_DONE:         CALL        REL_CLAMP        ; RELEASE PAPER CLAMP
                    CALL        ACT_INIT         ; INITIALIZE ACTIVE LIST
                    MOV         SCANLINE,0
                    MOV         SOL, 01H         ; READY FIRST SOLENOID
                    MOV         INSERTED, 0
                    MOV         AX, CSPECS_START
                    MOV         NXT2CHK,AX
                    CALL        SOLENOIDS_OFF    ; RELEASE ANY SOLENOIDS THAT
                                                 ; MIGHT INADVERTENTLY BE ON
                    CALL        MOTOR_ON         ; START MOVING PAPER

;************************************************************
; THIS IS THE TOP OF THE LOOP WHICH IS TRAVERSED ONCE PER SCANLINE
; FIRST WE WAIT TILL CARRIAGE RETURN DETECTED, THEN BUILD A SCANLINE
; AND DUMP IT EVERY TIME THEREAFTER THAT A PRINT CLOCK SIGNAL IS
; DETECTED.
;************************************************************

WAIT4RST:           CALL        PRTST
                    AND         AL,AL
                    JZ          WAIT4RST

;************************************************************
; CHECK NOW TO DETERMINE WHETHER ALL SCANLINES HAVE BEEN MADE
; AND, IF SO, QUIT AND TURN OFF THE MOTOR BEFORE RETURNING
;************************************************************

WEHAVERST:          CMP         SCANLINE, MAX_SCANS
                    JE          CHECK_PRINTED

CALL        BUILD_NXT_SCAN
                    MOV         BIT,0;

;************************************************************
; WAIT TILL PRINT CLOCK HAS BEEN ASSERTED
;************************************************************

WAIT4CLK:           CALL        PRTST
                    AND         AH,AH
                    JZ          WAIT4CLK

;       CHECK WHETHER ALL BITS IN THE SCANLINE HAVE BEEN ACCOUNTED FOR

WEHAVECLK:          CMP         BIT,BITS_PER_SCAN
                    JNE         DO_DE_BIT
                    INC         SCANLINE
                    JMP         WAIT4RST

; TURN OFF THE LAST SOLENOID BY TURNING OFF ALL OF THEM
; THEN FIND THE STATE OF THE CURRENT BIT AND, IF TRUE,
; FIRE PROPER SOLENOID

DO_DE_BIT:          AND         PR_SHADOW, 0F0H  ; OFF ALL SOLENOIDS

CALL        ISOLATE_BIT      ; TEST BIT "BIT"
                    AND         AL,AL            ; TEST VALUE PUT HERE
                                                 ; BY ISOLATE_BIT
                    JZ          DONT_FIRE

; WE WILL FIRE THE NEXT SOLENOID THIS TIME
```

```
FIRE_ONE:           MOV         DL,SOL
                    OR          PR_SHADOW,DL

;       WE MAY OR MAY NOT HAVE ORED A SOLENOID BIT INTO THE SHADOW AT THIS POINT

DONT_FIRE:          INC         BIT             ; POINT TO NEXT BIT
                    CMP         SOL,SOL4        ; IF TRUE RESET TO SOL1
                    JE          SOL_IS_8
SOL_NOT_8:          SHL         SOL,1           ; OTHERWISE SET NXT SOL
                    JMP         WRITE_SHADOW
SOL_IS_8:           MOV         SOL,SOL1        ; RESETS SOL TO SOL1
        ; WRITE THE VALUE IN THE SHADOW REGISTER TO THE OUTPUT PORT

WRITE_SHADOW:       MOV         AL, PR_SHADOW
                    MOV         PRINT_PORT,AL

; NOW WAIT FOR THE NEXT PRINT CLOCK

JMP         WAIT4CLK

; THE LAST SCANLINE SHOULD HAVE BEEN PRINTED.
        ; NOW TURN OFF THE MOTOR AND ALL SOLENOIDS AND RETURN

CHECK_PRINTED:      CALL        MOTOR_OFF;
                    CALL        SOLENOIDS_OFF

; NOW ALL DONE PRINTING, RETURN TO THE ROUTINE THAT CALLED PRNTR

;       POPA   **** 80186 INST.     ; RESTORE ALL REGISTERS REPLACED BY
                                    ; THE FOLLOWING

POP         BP
                    POP         SI
                    POP         DI
                    POP         SS
                    POP         ES
                    POP         DS
                    POP         DX
                    POP         CX
                    POP         BX
                    POP         AX

RET

;ROUTINES FOR MANAGING THE ACTIVE CELL LIST

;INITIALIZING THE ACTIVE CELL LIST

ACT_INIT:           MOV         BX,OFFSET ACTIVE_CELL_TABLE
                    MOV         CX,SIZE_OF_ACT
                    MOV         AX,01H
INIT_ACT:           MOV         [BX+ACT_FWD_PTR],AX  ;LINK EACH ENTRY BY
                    INC         AX                   ;MAKING EACH FORWARD
                    ADD         BX,6                 ;POINTER POINT TO THE
                    LOOP        INIT_ACT             ;NEXT ENTRY IN THE LIST
```

```
                MOV         FREE_LIST,0        ;FREE LIST STARTS WITH 0th ENTRY
                MOV         NUMBER_ACTIVE,0    ;ACTIVE LIST IS NULL
                MOV         ACTIVE_LIST,0FFFFH
                RET                            ;ALL DONE

;INSERTING A CELL SPEC INTO THE ACTIVE CELL LIST
;AX HOLDS INDEX INTO SORTED LIST OF CELL SPECS
;ALGORITHM IS:
;       OLD_ACTIVE = ACTIVE_LIST
;       ACTIVE_LIST = FREE_LIST
;       FREE_LIST = FREE_LIST(4)
;
;       ACTIVE_ENTRY(CSPINDX) = CELL SPEC INDEX
;       ACTIVE_ENTRY(BKPTR) = NULL    (THIS IS BACK PTR OF 1ST IN NEW ACT LIST)
;       ACTIVE_ENTRY(FWDPTR) = OLD_ACTIVE
;       IF OLD_ACTIVE NOT NULL THEN
;               OLD_ACTIVE ENTRY(BKPTR) = ACTIVE_LIST

INSERT_INTO_ACT:
                CMP         NUMBER_ACTIVE,MAX_ACTIVE_CELLS
                JAE         TOO_MANY_INSERTS
;       MAKE OLD_ACT = ACTIVE_LIST CX USED TO HOLD OLD_ACTIVE
                MOV         DX,ACTIVE_LIST
                MOV         CX, DX

;       ACTIVE_LIST = FREE_LIST
                MOV         SI, FREE_LIST
                MOV         ACTIVE_LIST,SI

;       FREE_LIST = FORMER 2ND ENTRY IN FREE LIST. MULTIPLY INDEX BY 6
                SHL         SI,1
                MOV         DI,SI
                SHL         SI,1
                ADD         SI,DI
                MOV         BX, OFFSET ACTIVE_CELL_TABLE
                MOV         DI, [BX+SI+ACT_FWD_PTR]
                MOV         FREE_LIST, DI

;       SI STILL POINTS TO OFFSET OF NEW ACTIVE ENTRY
;       FIX UP THREE ENTRIES IN NEWLY ACTIVE CELL
                MOV         [BX+SI+ACT_CSPEC_INDEX], AX  ; INDEX OF CSPEC BEING ADDED
                MOV         WORD PTR [BX+SI+ACT_BACK_PTR],0FFFFH
                MOV         AX, CX
                MOV         [BX+SI+ACT_FWD_PTR],AX
                CMP         AX,0FFFFH
                JE          BUMP_ACTIVES

;       OLD_ACTIVE WAS NOT NULL, SO LINK ITS BACK PTR TO THE NEW HEAD OF ACTIVES
;       AX HOLDS OLD_ACTIVE. MULTIPLY IT BY 6
                SHL         AX,1
                MOV         SI,AX
                SHL         SI,1
                ADD         SI,AX
                MOV         AX,ACTIVE_LIST
                MOV         [BX+SI+ACT_BACK_PTR],AX
BUMP_ACTIVES:   INC         NUMBER_ACTIVE
TOO_MANY_INSERTS: RET

;ROUTINE TO REMOVE EXHAUSTED CELL SPEC FROM ACTIVE LIST
;AND RETURN ITS SLOT TO FREE LIST. AX HOLDS INDEX INTO ACTIVE CELL TABLE OF;
;ENTRY TO BE REMOVED
```

```
REMOVE_FROM_ACT:
                CMP         NUMBER_ACTIVE,0             ;IF NONE,WE HAVE
                                                        ;A PROBLEM
                JG          OK_TO_REMOVE
                JMP         TOO_MANY_REMOVALS
OK_TO_REMOVE:   MOV         BX,OFFSET ACTIVE_CELL_TABLE ;HEAD OF TABLE
                MOV         SI,AX           ;MULTIPLY INDEX BY 6
                SHL         SI,1            ;TO MAKE IT A BYTE
                MOV         CX,SI           ;INDEX INTO THE ACT
                SHL         SI,1
                ADD         SI,CX
                MOV         DX,[BX+SI+ACT_BACK_PTR] ;SAVE THIS
                MOV         BACK,DX

MOV         DX,[BX+SI+ACT_FWD_PTR]      ;AND THIS
                MOV         FWD,DX

MOV         DX,FREE_LIST    ;LINK THIS ENTRY INTO
                MOV         [BX+SI+ACT_FWD_PTR],DX

MOV         FREE_LIST,AX    ;FREE LIST AHEAD OF ALL OTHERS
                CMP         BACK,0FFFFH     ;WAS HEAD OF ACT HOLDING
                JNE         NOT_FIRST       ;THE FIRST ENTRY IN FREE LIST
FIRST:          MOV         AX,FWD          ;YES, IT WAS
                MOV         ACTIVE_LIST,AX  ;ACTIVE NOW POINTS TO WHAT
                                            ;THIS ENTRY USED TO POINT TO
                MOV         SI,AX           ;MAKE THIS INTO BYTE INDEX
                SHL         SI,1
                MOV         CX,SI
                SHL         SI,1
                ADD         SI,CX
                MOV         WORD PTR [BX+SI+ACT_BACK_PTR],0FFFFH
                                            ;MAKE SUCESSOR'S
                                            ;BACK PTR NULL
                                            ;BECAUSE IT IS NEW HEAD
                                            ;OF ACTIVE LIST
                DEC         NUMBER_ACTIVE   ;ALL DONE
                RET

NOT_FIRST:      CMP         FWD,0FFFFH      ;IS ENTRY TO BE REMOVED IN MIDDLE
                JNE         MIDDLE
LAST:           MOV         SI,BACK         ;NO, IT IS LAST IN LIST
                SHL         SI,1
                MOV         CX,SI           ;MAKE THE PREDECESSOR'S
                SHL         SI,1            ;FORWARD
                ADD         SI,CX           ;POINTER
                MOV         WORD PTR [BX+SI+ACT_FWD_PTR],0FFFFH
                                            ;NULL FWD PTR BECAUSE LAST
                DEC         NUMBER_ACTIVE
                RET                         ;ALL DONE

MIDDLE:         MOV         SI,FWD          ;CELL TO BE REMOVED IS
                SHL         SI,1            ;SOMEWHERE IN THE MIDDLE
                MOV         CX,SI
                SHL         SI,1            ;MAKE PREDECESSOR'S
                ADD         SI,CX           ;FWD POINTER
                MOV         AX,BACK         ;POINT TO SUCESSOR
                MOV         [BX+SI+ACT_BACK_PTR],AX
                MOV         SI,AX           ;AND MAKE
                SHL         SI,1            ;SUCESSOR'S
                MOV         CX,SI           ;BACK PTR
```

```
                    SHL        SI,1                ;POINT TO
                    ADD        SI,CX               ;PREDECESSOR
                    MOV        AX,FWD
                    MOV        [BX+SI+ACT_FWD_PTR],AX
                    DEC        NUMBER_ACTIVE
TOO_MANY_REMOVALS:  RET                            ;ALL DONE

;
; ROUTINE TO DETERMINE THE STATE OF A BIT IN THE SCANLINE BUFFER

ISOLATE_BIT:        SUB        BX,BX               ; CLEAR THIS REGISTER
                    MOV        BL,BIT              ; GET INDEX OF BIT IN
                                                   ;   SCANLINE BUFFER
                    MOV        DL,BL               ; SAVE IT TEMPORARILY
                    MOV        CX,3                ; FOR DIVIDE BY 8 TO GET
                    SHR        BX,CL               ;   BYTE INDEX OF BUFF
                    AND        DL,7                ; FIND BIT REMAINDER
                    INC        DL                  ; FOR BITS TO SHIFT OUT
                    ADD        BX,OFFSET BUFF      ; POINT TO BYTE IN MEM
                    MOV        AL,[BX]             ; READ BYTE OF BUFF
                    MOV        CL,DL               ; SHIFT COUNT
                    SHL        AL,CL               ; SHIFT DESIRED BIT OUT
                                                   ; TO CARRY FLAG
                    JC         SET_BIT             ; IF CARRY THEN BIT = T
                    SUB        AX,AX               ; CLR AX IF BIT FALSE
                    RET
SET_BIT:            MOV        AX,1                ; SET AX IF BIT TRUE
                    RET

; ROUTINE TO TURN OFF ALL FOUR SOLENOIDS

SOLENOIDS_OFF:      AND        PR_SHADOW, NOT_SOLENOIDS
                    MOV        AL, PR_SHADOW
                    MOV        PRINT_PORT, AL
                    RET

; ROUTINE TO TURN MOTOR ON

MOTOR_ON:           OR         PR_SHADOW, MTRDRV
                    AND        PR_SHADOW, NOT_MTRSTP
                    MOV        AL, PR_SHADOW
                    MOV        PRINT_PORT,AL
                    RET

; ROUTINE TO TURN MOTOR OFF

MOTOR_OFF:          OR         PR_SHADOW, MTRSTP
                    AND        PR_SHADOW, NOT_MTRDRV
                    MOV        AL, PR_SHADOW
                    MOV        PRINT_PORT, AL
                    RET

; ROUTINE TO REMOVE ALL POWER FROM MOTOR

MTR_PWR_OFF:        AND        PR_SHADOW, NOT_MTRSTP
                    AND        PR_SHADOW, NOT_MTRDRV
```

```
                    MOV         AL, PR_SHADOW
                    MOV         PRINT_PORT, AL
                    RET

; ROUTINE TO FIRE A SOLENOID; WHATEVER VALUE IS IN SOL WHEN THIS ROUTINE
; IS CALLED WILL BE OUTPUT; ALL OTHER SOLENOIDS WILL BE TURNED OFF

FIRE_SOLENOID:      AND         PR_SHADOW, NOT_SOLENOIDS
                    MOV         AL, SOL
                    OR          PR_SHADOW, AL
                    MOV         PRINT_PORT, AL
                    RET

; ROUTINE TO SET THE STATE OF THE PAPER CLAMP TRUE, TO HOLD THE PAPER

SET_CLAMP:          OR          PR_SHADOW, CLAMP_ON
                    MOV         AL, PR_SHADOW
                    MOV         PRINT_PORT, AL
                    RET

; ROUTINE TO RELEASE THE PAPER CLAMP

REL_CLAMP:          AND         PR_SHADOW, CLAMP_OFF
                    MOV         AL, PR_SHADOW
                    MOV         PRINT_PORT, AL
                    RET

;################################################################
;
; ROUTINE TO BUILD THE NEXT SCANLINE USING THE ACTIVE CELL TABLE, THE CURRENT
; SCANLINE, AND ALL THE VALUES IN THE ACTIVE CELL SPECS
;
;################################################################

;       FIRST, CLEAR OUT THE OLD BUFFER SO ALL NEW DATA MAY BE ORED IN

BUILD_NXT_SCAN:
                    MOV         CX,08H       ; NUMBER OF WORDS TO CLEAR
                    SUB         AX,AX        ; CLEAR THIS TO ZERO
                    MOV         BX, OFFSET BUFF
CLR_BUFF:           MOV         [BX], AX;
                    INC         BX
                    INC         BX
                    LOOP        CLR_BUFF

;       NEXT FIND ANY NEW ACTIVE CELL SPECS TO INSERT INTO THE ACTIVE LIST
;       CHECK WHETHER ALL CSPECS HAVE BEEN MADE ACTIVE BY THIS TIME

CHECK4INSRT:        MOV         DX, INSERTED
                    CMP         DX, TOTAL_CELLS
                    JE          PROCESS_ACT

;       IF THEY HAVE NOT ALL BEEN PLACED INTO ACT THEN CHECK TO SEE IF ANY
;       WILL GO INTO ACT FOR THIS SCANLINE

MOV         BX, NXT2CHK   ; OFFS OF NXT CSPEC TO CHECK
                    MOV         AX,[BX]       ; AX NOW HAS SCANLINE
                    CMP         AX,SCANLINE   ; IS IT = CURRENT SCANLINE?
                    JNE         PROCESS_ACT   ; IF NOT, NO INSERTS
```

```
;       NOW INSERT CELLS INTO ACT WHILE THEIR SCANLINES ARE
;       EQUAL TO CURRENT SCANLINE

INSERT_CELL:    MOV     AX,BX               ; OFFS OF CSPEC TO INSERT
                INC     INSERTED            ; INDEX OF CSPEC TO GO IN
                CALL    INSERT_INTO_ACT
                ADD     NXT2CHK, CSPEC_SIZE_IN_BYTES
                JMP     CHECK4INSRT

;       NOW PROCESS ALL ACTIVE CELLS FIRST CECK WHETHER ANY ARE ACTIVE

PROCESS_ACT:    CMP     NUMBER_ACTIVE,0
                JG      SOME_R_ACTV
                RET                         ; BECAUSE NONE R ACTIVE

SOME_R_ACTV:    MOV     SI,ACTIVE_LIST      ; INDX OF ACT OF 1ST ENT
                MOV     NEXT_ENT,SI         ; IS NEXT TO LOOK AT
NEXT_CSPEC:     MOV     SI,NEXT_ENT         ; NEXT IS CURRENT
                MOV     THIS_ENT,SI         ; ONE TO LOOK AT
                SHL     SI,1                ; MAKE THIS_ENT AN INDX
                MOV     DI,SI
                SHL     SI,1
                ADD     SI,DI
;       SAVE INDEX IN ACT OF NEXT ENTRY TO CHECK, MAY BE FFFF IF NO MORE

MOV     BX,OFFSET ACTIVE_CELL_TABLE
                MOV     DX,[BX+SI+ACT_FWD_PTR] ; LINK TO NXT ACTIVE CELL
                MOV     NEXT_ENT,DX

;       NOW GET OFFSET OF CSPEC TO EXAMINE FIRST; BX STILL HAS OFFSET OF ACT

MOV     BX,[BX+SI]          ; CSPEC OFFSET IN SORTED TABLE

;       PROCESS ONE CELL SPEC

MOV     DI,[BX+CSPEC_XBYTEOFFS]
                AND     DI, 00FFH           ; WE ONLY WANT BYTE IN LOW
                                            ; HALF OF DI REG
                MOV     SI,[BX+CSPEC_FMEMOFFS]
                SUB     CX,CX
                MOV     CL,[BX+CSPEC_WIDTH]
                SUB     DX,DX               ; CLEAR SAVE REGISTER
ONE_CELL:       SUB     AX,AX               ; CLEAR WORK REGISTER
                MOV     AH, CS:[SI]         ; READ A BYTE OF FONT MEM
                                            ; FROM CODE SEGMENT
                PUSH    CX
                MOV     CL,[BX+CSPEC_XBITOFFS]
                SHR     AX,CL               ; ALIGN WITH SCANLINE
                                            ; BIT OFFSET
                POP     CX                  ; RESTORE WIDTH LOOP CTR
                OR      AH,DH               ; OR IN SAVED BITS FROM
                                            ; PREVIOUS BYTE
                MOV     BP, OFFSET BUFF
                OR      DS:[BP+DI],AH       ; OR DATA INTO SCANLINE
                MOV     DH,AL               ; SAVE BITS SHIFTED OUT
                INC     DI                  ; INC SCANLINE BYTE INDEX
                INC     SI                  ; INC FONT MEM INDEX
                LOOP    ONE_CELL
;       NOW IF DH NOT ZERO THEN THERE WAS DATA SHIFTED OUT OF AX WHICH MUST
;       ALSO BE ORED INTO THE SCANLINE. THE BYTE OFFSET IN DI HAS BEEN INCREMENTED
;       SO JUST OR IN DH RATHER THAN AH
```

```
            OR          DS:[BP+01],0H

MOV         [BX+CSPEC_FMEMOFFS],SI
                        ; UPDATE FONT MEM OFFSET
            DEC         BYTE PTR [BX+CSPEC_HEIGHT]
            JNZ         GETNXTCSPC
            MOV         AX,THIS_ENT
            CALL        REMOVE_FROM_ACT
GETNXTCSPC: CMP         NEXT_ENT, 0FFFFH
            JNE         NEXT_CSPEC

NO_MORE_ACTV:  RET                ; ALL ACTIVE CELLS PROCESSED
```

Although the preferred embodiment of the invention describes a method and apparatus for dispensing money orders, it should be appreciated that the present invention may be utilized to dispense any type of negotiable instrument.

Although the invention has been described in detail, it is to be clearly understood that the same is by way of illustration and example only and is not to be taken by way of limitation, the spirit and scope of the invention being limited only to the terms of the appended claims.

I claim:

1. A system for dispensing negotiable instruments at a plurality of retail establishments, including one or more data collector devices connected to a host device, comprising:
   one or more sets of dispensers connected to said one or more data collector devices, respectively, each of said dispensers including:
   digital processing means for controlling the operation of said dispenser;
   keyboard means connected to said digital processing means for entering transaction data to request the printing of a negotiable instrument;
   display means connected to said digital processing means for displaying said transaction data entered on said keyboard means;
   memory means associated with said digital processing means for storing operating programs, transaction and control data, and a security inhibit printing code;
   means for detecting the security inhibit printing code;
   printing means responsive to said detection means for printing alphanumeric indicia on said negotiable instrument in response to a money order request input to said keyboard means; and
   control means responsive to tampering with said dispenser for changing the security inhibit printing code stored in said memory means to thereby prevent operation of said printing means when the security of the dispenser is compromised.

2. The system for dispensing negotiable instruments as described in claim 1 wherein said memory means includes an electrically-erasable programmable read only memory (E²PROM) for storing the security inhibit printing code for said dispenser.

3. The system for dispensing negotiable instruments as described in claim 1 wherein said negotiable instrument has a relatively long longitudinal side and a relatively short transverse side and indicia preprinted thereon in a longitudinal direction, said printing means including a dot matrix printer extending across said transverse side of said negotiable instrument for receiving the negotiable instrument and printing said alphanumeric indicia thereon.

4. The system for dispensing negotiable instruments as described in claim 3 further including control means for controlling said dot matrix printer to change the orientation of said alphanumeric indicia such that said negotiable instrument is produced in a readable form.

5. The system for dispensing negotiable instruments as described in claim 3 wherein said printing means includes sensing means for determining whether said negotiable instrument is properly located in said dot matrix printer and the printer is completely operational prior to printing.

6. A system for dispensing money orders at a plurality of retail establishments, including a host device, comprising:
   a plurality of money order dispensers each including:
   a digital processor for controlling the operation of said dispenser;
   a keyboard connected to said processor for entering transaction data to request the printing of a money order;
   a display connected to said processor for displaying said transaction data entered on said keyboard;
   a memory associated with said processor and having a first dedicated portion thereof for storing said transaction data and a security inhibit printing code;
   means for detecting the security inhibit printing code;
   a printer responsive to the detection means for printing alphanumeric indicia on said memory order; and
   control means responsive to tampering with said dispenser for changing the security inhibit printing code stored in the memory to thereby prevent operation of said printer when the security of the dispenser is compromised; and
   means for connecting said plurality of money order dispensers to said host device.

7. The system for dispensing money orders as described in claim 6 wherein said first dedicated portion of said memory is an electrically-erasable programmable read only memory (E²PROM) which stores the security inhibit printing code for said dispenser.

8. The system for dispensing money orders as described in claim 6 wherein said data collector device includes control management means for defining control data for managing the operation of said plurality of money order dispensers.

9. A money order dispenser for dispensing money orders at a retail establishment, comprising:
   a digital processor for controlling the operation of said dispenser;
   a keyboard connected to said processor for entering transaction data to request the printing of a money order;

a display connected to said processor for displaying said transaction data entered on said keyboard;

a memory associated with said processor and having a first dedicated portion thereof for storing said transaction data and a security inhibit printing code;

means for detecting the security inhibit printing code;

a printer responsive to the detection means for printing alphanumeric indicia on the money order; and control means responsive to tampering with the dispenser for changing the security inhibit printing code stored in the memory to thereby prevent operation of said printer when the security of the dispenser is compromised.

10. The money order dispenser as described in claim 9 wherein said first dedicated portion of said memory is an electrically-erasable programmable read only memory ($E^2PROM$) which stores the security inhibit printing code for said dispenser.

11. A money order dispenser for dispensing money orders at a retail establishment, comprising:

a digital processor for controlling the operation of the dispenser;

a keyboard connected to the digital processor for entering transaction data, control data for managing the operation of the dispenser, a first security code authorizing access to the dispenser to enable entry of said control data, and a second security code authorizing the printing of a money order;

a display connected to the digital processor for displaying the transaction and control data entered on the keyboard;

a memory associated with the digital processor for storing the transaction data and control data;

a printer controlled by said digital processor for receiving a money order and printing alphanumeric indicia thereon;

means for detecting entry of the first and second security codes via the keyboard and for detecting if the security of the dispenser is compromised; and control means responsive to said means for detecting for inhibiting entry of said control data via said keyboard when said first security code is not properly entered on said keyboard, for inhibiting entry of said transaction data when said second security code is not properly entered on said keyboard, and for preventing operation of said printer when the security of the dispenser is compromised.

* * * * *

UNITED STATES PATENT AND TRADEMARK OFFICE
CERTIFICATE OF CORRECTION

PATENT NO. : 4,625,275
DATED : November 25, 1986
INVENTOR(S) : Lawrence G. Smith It is certified that error appears in the above-identified patent and that said Letters Patent is hereby corrected as shown below:

Column 6, line 33, after "interrupted," insert --if a previously determined amount or number of money orders, or other system operator-imposed constraints, have been exceeded,--.

Signed and Sealed this

Twenty-eight Day of February, 1995

Attest:

BRUCE LEHMAN

Attesting Officer

Commissioner of Patents and Trademarks